(12) United States Patent
Joannopoulos et al.

(10) Patent No.: US 10,666,091 B2
(45) Date of Patent: *May 26, 2020

(54) WIRELESS NON-RADIATIVE ENERGY TRANSFER

(71) Applicant: Massachusetts Institute of Technology, Cambridge, MA (US)

(72) Inventors: John D. Joannopoulos, Belmont, MA (US); Aristeidis Karalis, Boston, MA (US); Marin Soljacic, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/184,354

(22) Filed: Nov. 8, 2018

(65) Prior Publication Data

US 2019/0173318 A1    Jun. 6, 2019

Related U.S. Application Data

(63) Continuation of application No. 15/793,198, filed on Oct. 25, 2017, now Pat. No. 10,141,790, which is a
(Continued)

(51) Int. Cl.
*H02J 50/12* (2016.01)
*H01Q 9/04* (2006.01)
(Continued)

(52) U.S. Cl.
CPC .............. *H02J 50/12* (2016.02); *B60L 50/50* (2019.02); *B60L 53/12* (2019.02); *H01F 38/14* (2013.01);
(Continued)

(58) Field of Classification Search
CPC ....................................................... H02J 50/12
See application file for complete search history.

(56) References Cited

U.S. PATENT DOCUMENTS

| 645,576 A | 3/1900 | Tesla |
| 649,621 A | 5/1900 | Tesla |

(Continued)

FOREIGN PATENT DOCUMENTS

| CA | 142352 | 8/1912 |
| CN | 1309793 | 8/2001 |

(Continued)

OTHER PUBLICATIONS

"Intel CTO Says Gap between Humans, Machines Will Close by 2050", *Intel News Release*, (See intel.com/.../20080821comp.htm?iid=S...) (Printed Nov. 6, 2009).
(Continued)

*Primary Examiner* — Daniel Kessie
(74) *Attorney, Agent, or Firm* — Fish & Richardson P.C.

(57) ABSTRACT

Described herein are embodiments of a source high-Q resonator, optionally coupled to an energy source, a second high-Q resonator, optionally coupled to an energy drain that may be located a distance from the source resonator. A third high-Q resonator, optionally coupled to an energy drain that may be located a distance from the source resonator. The source resonator and at least one of the second resonator and third resonator may be coupled to transfer electromagnetic energy from said source resonator to said at least one of the second resonator and third resonator.

20 Claims, 7 Drawing Sheets

Related U.S. Application Data continuation of application No. 15/083,726, filed on Mar. 29, 2016, now Pat. No. 9,831,722, which is a continuation of application No. 14/629,709, filed on Feb. 24, 2015, now Pat. No. 9,450,421, which is a continuation of application No. 14/302,662, filed on Jun. 12, 2014, now Pat. No. 9,065,286, which is a continuation of application No. 12/639,963, filed on Dec. 16, 2009, now Pat. No. 8,760,007, which is a continuation of application No. 12/553,957, filed on Sep. 3, 2009, now abandoned, which is a continuation of application No. 11/481,077, filed on Jul. 5, 2006, now Pat. No. 7,741,734.

(60) Provisional application No. 60/698,442, filed on Jul. 12, 2005.

(51) Int. Cl.
*B60L 50/50* (2019.01)
*B60L 53/12* (2019.01)
*H01F 38/14* (2006.01)

(52) U.S. Cl.
CPC ............ *H01Q 9/04* (2013.01); *Y02T 10/7005* (2013.01); *Y02T 10/7072* (2013.01); *Y02T 10/7088* (2013.01); *Y02T 90/122* (2013.01); *Y02T 90/14* (2013.01); *Y10T 307/25* (2015.04)

(56) References Cited

U.S. PATENT DOCUMENTS

| | | | |
|---|---|---|---|
| 787,412 A | 4/1905 | Tesla | |
| 1,119,732 A | 12/1914 | Tesla | |
| 2,133,494 A | 10/1938 | Waters | |
| 2,266,262 A | 12/1941 | Polydoroff | |
| 3,517,350 A | 6/1970 | Beaver | |
| 3,535,543 A | 10/1970 | Dailey | |
| 3,780,425 A | 12/1973 | Penn et al. | |
| 3,871,176 A | 3/1975 | Schukei | |
| 4,088,999 A | 5/1978 | Fletcher et al. | |
| 4,095,998 A | 6/1978 | Hanson | |
| 4,180,795 A | 12/1979 | Matsuda et al. | |
| 4,280,129 A | 7/1981 | Wells | |
| 4,441,210 A | 4/1984 | Hochmair et al. | |
| 4,450,431 A | 5/1984 | Hochstein | |
| 4,588,978 A | 5/1986 | Allen | |
| 4,621,243 A | 11/1986 | Harada | |
| 4,679,560 A | 7/1987 | Galbraith | |
| 5,027,709 A | 7/1991 | Slagle | |
| 5,033,295 A | 7/1991 | Schmid et al. | |
| 5,034,658 A | 7/1991 | Hiering et al. | |
| 5,053,774 A | 10/1991 | Schuermann et al. | |
| 5,070,293 A | 12/1991 | Ishii et al. | |
| 5,118,997 A | 6/1992 | El-Hamamsy | |
| 5,216,402 A | 6/1993 | Carosa | |
| 5,229,652 A | 7/1993 | Hough | |
| 5,287,112 A | 2/1994 | Schuermann | |
| 5,293,308 A | 3/1994 | Boys et al. | |
| 5,341,083 A | 8/1994 | Klontz et al. | |
| 5,367,242 A | 11/1994 | Hulman | |
| 5,374,930 A | 12/1994 | Schuermann | |
| 5,408,209 A | 4/1995 | Tanzer et al. | |
| 5,437,057 A | 7/1995 | Richley et al. | |
| 5,455,467 A * | 10/1995 | Young | H02J 50/10 307/104 |
| 5,493,691 A | 2/1996 | Barrett | |
| 5,522,856 A | 6/1996 | Reineman | |
| 5,528,113 A | 6/1996 | Boys et al. | |
| 5,541,604 A | 7/1996 | Meier | |
| 5,550,452 A | 8/1996 | Shirai et al. | |
| 5,565,763 A | 10/1996 | Arrendale et al. | |
| 5,630,835 A | 5/1997 | Brownlee | |
| 5,631,660 A | 5/1997 | Higashiguchi et al. | |
| 5,697,956 A | 12/1997 | Bornzin | |
| 5,703,461 A | 12/1997 | Minoshima et al. | |
| 5,703,573 A | 12/1997 | Fujimoto et al. | |
| 5,710,413 A | 1/1998 | King et al. | |
| 5,742,471 A | 4/1998 | Barbee, Jr. et al. | |
| 5,821,728 A | 10/1998 | Schwind | |
| 5,821,731 A | 10/1998 | Kuki et al. | |
| 5,864,323 A | 1/1999 | Berthon | |
| 5,898,579 A | 4/1999 | Boys et al. | |
| 5,903,134 A | 5/1999 | Takeuchi | |
| 5,923,544 A | 7/1999 | Urano | |
| 5,940,509 A | 8/1999 | Jovanovich et al. | |
| 5,957,956 A | 9/1999 | Kroll et al. | |
| 5,959,245 A | 9/1999 | Moe et al. | |
| 5,986,895 A | 11/1999 | Stewart et al. | |
| 5,993,996 A | 11/1999 | Firsich | |
| 5,999,308 A | 12/1999 | Nelson et al. | |
| 6,012,659 A | 1/2000 | Nakazawa et al. | |
| 6,028,429 A | 2/2000 | Green et al. | |
| 6,047,214 A | 4/2000 | Mueller et al. | |
| 6,066,163 A | 5/2000 | John | |
| 6,067,473 A | 5/2000 | Greeninger et al. | |
| 6,101,300 A | 8/2000 | Fan et al. | |
| 6,108,579 A | 8/2000 | Snell et al. | |
| 6,127,799 A | 10/2000 | Krishnan | |
| 6,130,591 A | 10/2000 | Tsuzuki | |
| 6,176,433 B1 | 1/2001 | Uesaka et al. | |
| 6,184,651 B1 | 2/2001 | Fernandez et al. | |
| 6,207,887 B1 | 3/2001 | Bass et al. | |
| 6,225,800 B1 | 5/2001 | Zhang et al. | |
| 6,232,841 B1 | 5/2001 | Bartlett et al. | |
| 6,238,387 B1 | 5/2001 | Miller, III | |
| 6,240,318 B1 | 5/2001 | Phillips | |
| 6,252,762 B1 | 6/2001 | Amatucci | |
| 6,262,639 B1 | 7/2001 | Shu et al. | |
| 6,300,760 B1 | 10/2001 | Schubert et al. | |
| 6,407,470 B1 | 6/2002 | Seelig | |
| 6,436,299 B1 | 8/2002 | Baarman et al. | |
| 6,450,946 B1 | 9/2002 | Forsell | |
| 6,452,465 B1 | 9/2002 | Brown et al. | |
| 6,459,218 B2 | 10/2002 | Boys et al. | |
| 6,473,028 B1 | 10/2002 | Luc | |
| 6,483,202 B1 | 11/2002 | Boys | |
| 6,515,878 B1 | 2/2003 | Meins et al. | |
| 6,533,178 B1 | 3/2003 | Gaul et al. | |
| 6,535,133 B2 | 3/2003 | Gohara | |
| 6,561,975 B1 | 5/2003 | Pool et al. | |
| 6,563,425 B2 | 5/2003 | Nicholson et al. | |
| 6,597,076 B2 | 7/2003 | Scheible et al. | |
| 6,609,023 B1 | 8/2003 | Fischell et al. | |
| 6,631,072 B1 | 10/2003 | Paul et al. | |
| 6,650,227 B1 | 11/2003 | Bradin | |
| 6,664,770 B1 | 12/2003 | Bartels | |
| 6,673,250 B2 | 1/2004 | Kuennen et al. | |
| 6,683,256 B2 | 1/2004 | Kao | |
| 6,696,647 B2 | 2/2004 | Ono et al. | |
| 6,703,921 B1 | 3/2004 | Wuidart et al. | |
| 6,731,071 B2 | 5/2004 | Baarman | |
| 6,749,119 B2 | 6/2004 | Scheible et al. | |
| 6,772,011 B2 | 8/2004 | Dolgin | |
| 6,798,716 B1 | 9/2004 | Charych | |
| 6,803,744 B1 | 10/2004 | Sabo | |
| 6,806,649 B2 | 10/2004 | Mollema et al. | |
| 6,812,645 B2 | 11/2004 | Baarman | |
| 6,825,620 B2 | 11/2004 | Kuennen et al. | |
| 6,831,417 B2 | 12/2004 | Baarman | |
| 6,839,035 B1 | 1/2005 | Addonisio et al. | |
| 6,844,702 B2 | 1/2005 | Giannopoulos et al. | |
| 6,856,291 B2 | 2/2005 | Mickle et al. | |
| 6,858,970 B2 | 2/2005 | Malkin et al. | |
| 6,906,495 B2 | 6/2005 | Cheng et al. | |
| 6,917,163 B2 | 7/2005 | Baarman | |
| 6,917,431 B2 | 7/2005 | Soljacic et al. | |
| 6,937,130 B2 | 8/2005 | Scheible et al. | |
| 6,960,968 B2 | 11/2005 | Odendaal et al. | |
| 6,961,619 B2 | 11/2005 | Casey | |
| 6,967,462 B1 | 11/2005 | Landis | |
| 6,975,198 B2 | 12/2005 | Baarman | |
| 6,988,026 B2 | 1/2006 | Breed et al. | |

(56) References Cited

U.S. PATENT DOCUMENTS

| | | |
|---|---|---|
| 7,027,311 B2 | 4/2006 | Vanderelli et al. |
| 7,035,076 B1 | 4/2006 | Stevenson |
| 7,042,196 B2 | 5/2006 | Ka-Lai et al. |
| 7,058,357 B1 | 6/2006 | Wuidart et al. |
| 7,069,064 B2 | 6/2006 | Govorgian et al. |
| 7,084,605 B2 | 8/2006 | Mickle et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,127,293 B2 | 10/2006 | MacDonald |
| 7,132,918 B2 | 11/2006 | Baarman et al. |
| 7,147,604 B1 | 12/2006 | Allen et al. |
| 7,180,248 B2 | 2/2007 | Kuennen et al. |
| 7,191,007 B2 | 3/2007 | Desai et al. |
| 7,193,418 B2 | 3/2007 | Freytag |
| 7,212,414 B2 | 5/2007 | Baarman |
| 7,233,137 B2 | 6/2007 | Nakamura et al. |
| 7,239,110 B2 | 7/2007 | Cheng et al. |
| 7,248,017 B2 | 7/2007 | Cheng et al. |
| 7,251,527 B2 | 7/2007 | Lyden |
| 7,288,918 B2 | 10/2007 | DiStefano |
| 7,375,492 B2 | 5/2008 | Calhoon et al. |
| 7,375,493 B2 | 5/2008 | Calhoon et al. |
| 7,378,817 B2 | 5/2008 | Calhoon et al. |
| 7,382,636 B2 | 6/2008 | Baarman et al. |
| 7,385,357 B2 | 6/2008 | Kuennen et al. |
| 7,443,135 B2 | 10/2008 | Cho |
| 7,462,951 B1 | 12/2008 | Baarman |
| 7,466,213 B2 | 12/2008 | Lobl et al. |
| 7,474,058 B2 | 1/2009 | Baarman |
| 7,492,247 B2 | 2/2009 | Schmidt et al. |
| 7,514,818 B2 | 4/2009 | Abe et al. |
| 7,518,267 B2 | 4/2009 | Baarman |
| 7,525,283 B2 | 4/2009 | Cheng et al. |
| 7,545,337 B2 | 6/2009 | Guenther |
| 7,599,743 B2 | 10/2009 | Hassler, Jr. et al. |
| 7,615,936 B2 | 11/2009 | Baarman et al. |
| 7,639,514 B2 | 12/2009 | Baarman |
| 7,741,734 B2 | 6/2010 | Joannopoulos et al. |
| 7,795,708 B2 | 9/2010 | Katti |
| 7,825,543 B2 | 11/2010 | Karalis et al. |
| 7,843,288 B2 | 11/2010 | Lee et al. |
| 7,863,859 B2 | 1/2011 | Soar |
| 8,022,576 B2 | 9/2011 | Joannopoulos et al. |
| 8,076,800 B2 | 12/2011 | Joannopoulos et al. |
| 8,076,801 B2 | 12/2011 | Karalis et al. |
| 8,077,485 B2 | 12/2011 | Lee |
| 8,084,889 B2 | 12/2011 | Joannopoulos et al. |
| 8,097,983 B2 | 1/2012 | Karalis et al. |
| 8,131,378 B2 | 3/2012 | Greenberg et al. |
| 8,178,995 B2 | 5/2012 | Amano et al. |
| 8,362,651 B2 | 1/2013 | Hamam et al. |
| 8,395,282 B2 | 3/2013 | Joannopoulos et al. |
| 8,395,283 B2 | 3/2013 | Joannopoulos et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 8,760,007 B2 | 6/2014 | Joannopoulos et al. |
| 8,760,008 B2 | 6/2014 | Joannopoulos et al. |
| 8,766,485 B2 | 7/2014 | Joannopoulos et al. |
| 8,772,971 B2 | 7/2014 | Joannopoulos et al. |
| 8,772,972 B2 | 7/2014 | Joannopoulos et al. |
| 8,791,599 B2 | 7/2014 | Joannopoulos et al. |
| 8,836,172 B2 | 9/2014 | Hamam et al. |
| 9,065,286 B2 | 6/2015 | Joannopoulos et al. |
| 9,444,265 B2 | 9/2016 | Karalis et al. |
| 9,450,421 B2 | 9/2016 | Joannopoulos et al. |
| 9,450,422 B2 | 9/2016 | Karalis et al. |
| 9,509,147 B2 | 11/2016 | Karalis et al. |
| 9,831,722 B2 * | 11/2017 | Joannopoulos ......... H02J 50/12 |
| 10,141,790 B2 * | 11/2018 | Joannopoulos ......... H02J 50/12 |
| 2001/0012208 A1 | 8/2001 | Boys |
| 2002/0032471 A1 | 3/2002 | Loftin et al. |
| 2002/0105343 A1 | 8/2002 | Scheible et al. |
| 2002/0118004 A1 | 8/2002 | Scheible et al. |
| 2002/0130642 A1 | 9/2002 | Ettes et al. |
| 2002/0167294 A1 | 11/2002 | Odaohhara |
| 2003/0038641 A1 | 2/2003 | Scheible |
| 2003/0062794 A1 | 4/2003 | Scheible et al. |
| 2003/0062980 A1 | 4/2003 | Scheible et al. |
| 2003/0071034 A1 | 4/2003 | Thompson et al. |
| 2003/0124050 A1 | 7/2003 | Yadav et al. |
| 2003/0126948 A1 | 7/2003 | Yadav et al. |
| 2003/0160590 A1 | 8/2003 | Schaefer et al. |
| 2003/0199778 A1 | 10/2003 | Mickle et al. |
| 2003/0214255 A1 | 11/2003 | Baarman et al. |
| 2004/0000974 A1 | 1/2004 | Odenaal et al. |
| 2004/0026998 A1 | 2/2004 | Henriott et al. |
| 2004/0100338 A1 | 5/2004 | Clark |
| 2004/0113847 A1 | 6/2004 | Qi et al. |
| 2004/0130425 A1 | 7/2004 | Dayan et al. |
| 2004/0130915 A1 | 7/2004 | Baarman |
| 2004/0130916 A1 | 7/2004 | Baarman |
| 2004/0142733 A1 | 7/2004 | Parise |
| 2004/0150934 A1 | 8/2004 | Baarman |
| 2004/0189246 A1 | 9/2004 | Bulai et al. |
| 2004/0201361 A1 | 10/2004 | Koh et al. |
| 2004/0222751 A1 | 11/2004 | Mollema et al. |
| 2004/0227057 A1 | 11/2004 | Tuominen et al. |
| 2004/0232845 A1 | 11/2004 | Baarman |
| 2004/0233043 A1 | 11/2004 | Yazawa et al. |
| 2004/0267501 A1 | 12/2004 | Freed et al. |
| 2005/0007067 A1 | 1/2005 | Baarman et al. |
| 2005/0020224 A1 | 1/2005 | Locatelli et al. |
| 2005/0021134 A1 | 1/2005 | Opie |
| 2005/0027192 A1 | 2/2005 | Govari et al. |
| 2005/0030251 A1 | 2/2005 | Okamura et al. |
| 2005/0033382 A1 | 2/2005 | Single |
| 2005/0085873 A1 | 4/2005 | Gord et al. |
| 2005/0093475 A1 | 5/2005 | Kuennen et al. |
| 2005/0104064 A1 | 5/2005 | Hegarty et al. |
| 2005/0104453 A1 | 5/2005 | Vanderelli et al. |
| 2005/0116650 A1 | 6/2005 | Baarman |
| 2005/0116683 A1 | 6/2005 | Cheng et al. |
| 2005/0122058 A1 | 6/2005 | Baarman et al. |
| 2005/0122059 A1 | 6/2005 | Baarman et al. |
| 2005/0125093 A1 | 6/2005 | Kikuchi et al. |
| 2005/0127849 A1 | 6/2005 | Baarman et al. |
| 2005/0127850 A1 | 6/2005 | Baarman et al. |
| 2005/0127866 A1 | 6/2005 | Hamilton et al. |
| 2005/0135122 A1 | 6/2005 | Cheng et al. |
| 2005/0140482 A1 | 6/2005 | Cheng et al. |
| 2005/0151511 A1 | 7/2005 | Chary |
| 2005/0156560 A1 | 7/2005 | Shimaoka et al. |
| 2005/0189945 A1 | 9/2005 | Reiderman |
| 2005/0194926 A1 | 9/2005 | Di Stefano |
| 2005/0253152 A1 | 11/2005 | Klimov et al. |
| 2005/0288739 A1 | 12/2005 | Hassler, Jr. et al. |
| 2005/0288740 A1 | 12/2005 | Hassler, Jr. et al. |
| 2005/0288741 A1 | 12/2005 | Hassler, Jr. et al. |
| 2005/0288742 A1 | 12/2005 | Giordano et al. |
| 2006/0001509 A1 | 1/2006 | Gibbs |
| 2006/0022636 A1 | 2/2006 | Xian et al. |
| 2006/0044188 A1 | 3/2006 | Tsai et al. |
| 2006/0053296 A1 | 3/2006 | Busboom et al. |
| 2006/0061323 A1 | 3/2006 | Cheng et al. |
| 2006/0066443 A1 | 3/2006 | Hall |
| 2006/0090956 A1 | 5/2006 | Peshkovskiy et al. |
| 2006/0132045 A1 | 6/2006 | Baarman |
| 2006/0159392 A1 | 7/2006 | Popovic |
| 2006/0164866 A1 | 7/2006 | Vanderelli et al. |
| 2006/0164868 A1 | 7/2006 | Weber |
| 2006/0181242 A1 | 8/2006 | Freed et al. |
| 2006/0184209 A1 | 8/2006 | John et al. |
| 2006/0184210 A1 | 8/2006 | Singhal et al. |
| 2006/0185809 A1 | 8/2006 | Elfrink et al. |
| 2006/0199620 A1 | 9/2006 | Greene et al. |
| 2006/0202665 A1 | 9/2006 | Hsu |
| 2006/0205381 A1 | 9/2006 | Beart et al. |
| 2006/0214626 A1 | 9/2006 | Nilson et al. |

(56) References Cited

U.S. PATENT DOCUMENTS

| | | |
|---|---|---|
| 2006/0219448 A1 | 10/2006 | Grieve et al. |
| 2006/0238365 A1 | 10/2006 | Vecchione et al. |
| 2006/0270440 A1 | 11/2006 | Shearer et al. |
| 2006/0281435 A1 | 12/2006 | Shearer et al. |
| 2006/0284708 A1 | 12/2006 | Reeves |
| 2007/0008140 A1 | 1/2007 | Saarisalo et al. |
| 2007/0010295 A1 | 1/2007 | Greene et al. |
| 2007/0013483 A1 | 1/2007 | Stewart |
| 2007/0016089 A1 | 1/2007 | Fischell et al. |
| 2007/0021140 A1 | 1/2007 | Keyes, IV et al. |
| 2007/0024246 A1 | 2/2007 | Flaugher |
| 2007/0064406 A1 | 3/2007 | Beart |
| 2007/0069687 A1 | 3/2007 | Suzuki |
| 2007/0096875 A1 | 5/2007 | Waterhouse et al. |
| 2007/0105429 A1 | 5/2007 | Kohl et al. |
| 2007/0117596 A1 | 5/2007 | Greene et al. |
| 2007/0126650 A1 | 6/2007 | Guenther |
| 2007/0145830 A1 | 6/2007 | Lee et al. |
| 2007/0171681 A1 | 7/2007 | Baarman |
| 2007/0176840 A1 | 8/2007 | Pristas et al. |
| 2007/0178945 A1 | 8/2007 | Cook et al. |
| 2007/0182367 A1 | 8/2007 | Partovi |
| 2007/0208263 A1 | 9/2007 | John et al. |
| 2007/0222542 A1 | 9/2007 | Joannopoulos et al. |
| 2007/0247005 A1 | 10/2007 | Tetlow |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0067874 A1 | 3/2008 | Tseng |
| 2008/0191638 A1 | 8/2008 | Kuennen et al. |
| 2008/0197710 A1 | 8/2008 | Kreitz et al. |
| 2008/0211320 A1 | 9/2008 | Cook et al. |
| 2008/0265684 A1 | 10/2008 | Farkas |
| 2008/0266748 A1 | 10/2008 | Lee |
| 2008/0278264 A1 | 11/2008 | Karalis et al. |
| 2008/0294208 A1 | 11/2008 | Willis et al. |
| 2009/0010028 A1 | 1/2009 | Baarmen et al. |
| 2009/0015075 A1 | 1/2009 | Cook et al. |
| 2009/0033564 A1 | 2/2009 | Cook et al. |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0079268 A1 | 3/2009 | Cook et al. |
| 2009/0085408 A1 | 4/2009 | Bruhn |
| 2009/0085706 A1 | 4/2009 | Baarman et al. |
| 2009/0096413 A1 | 4/2009 | Patovi et al. |
| 2009/0102292 A1 | 4/2009 | Cook et al. |
| 2009/0108679 A1 | 4/2009 | Porwal |
| 2009/0108997 A1 | 4/2009 | Patterson et al. |
| 2009/0127937 A1 | 5/2009 | Widmer et al. |
| 2009/0134712 A1 | 5/2009 | Cook et al. |
| 2009/0146892 A1 | 6/2009 | Shimizu et al. |
| 2009/0153273 A1 | 6/2009 | Chen |
| 2009/0160261 A1 | 6/2009 | Elo |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0224608 A1 | 9/2009 | Cook et al. |
| 2009/0224609 A1 | 9/2009 | Cook et al. |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2010/0038970 A1 | 2/2010 | Cook et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0148589 A1 | 6/2010 | Hamam et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0231163 A1 | 9/2010 | Mashinsky |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2010/0277005 A1 | 11/2010 | Karalis et al. |
| 2010/0289449 A1 | 11/2010 | Elo |
| 2010/0327660 A1 | 12/2010 | Karalis et al. |
| 2010/0327661 A1 | 12/2010 | Karalis et al. |
| 2011/0012431 A1 | 1/2011 | Karalis et al. |
| 2011/0018361 A1 | 1/2011 | Karalis et al. |
| 2011/0025131 A1 | 2/2011 | Karalis et al. |
| 2011/0043046 A1 | 2/2011 | Joannopoulos et al. |
| 2011/0049996 A1 | 3/2011 | Karalis et al. |
| 2011/0049998 A1 | 3/2011 | Karalis et al. |
| 2011/0074218 A1 | 3/2011 | Karalis et al. |
| 2011/0074347 A1 | 3/2011 | Karalis et al. |
| 2011/0089895 A1 | 4/2011 | Karalis et al. |
| 2011/0140544 A1 | 6/2011 | Karalis et al. |
| 2011/0148219 A1 | 6/2011 | Karalis et al. |
| 2011/0162895 A1 | 7/2011 | Karalis et al. |
| 2011/0169339 A1 | 7/2011 | Karalis et al. |
| 2011/0181122 A1 | 7/2011 | Karalis et al. |
| 2011/0193419 A1 | 8/2011 | Karalis et al. |
| 2011/0198939 A1 | 8/2011 | Karalis et al. |
| 2011/0221278 A1 | 9/2011 | Karalis et al. |
| 2011/0227528 A1 | 9/2011 | Karalis et al. |
| 2011/0227530 A1 | 9/2011 | Karalis et al. |
| 2011/0241618 A1 | 10/2011 | Karalis et al. |
| 2012/0068549 A1 | 3/2012 | Karalis et al. |
| 2012/0228960 A1 | 9/2012 | Karalis et al. |
| 2013/0181541 A1 | 7/2013 | Karalis et al. |
| 2014/0354071 A1 | 12/2014 | Hamam et al. |

(56) References Cited

U.S. PATENT DOCUMENTS

FOREIGN PATENT DOCUMENTS

| | | |
|---|---|---|
| CN | 1370341 | 9/2002 |
| CN | 1703823 | 11/2005 |
| CN | 1993863 | 7/2007 |
| DE | 30 43 441 | 6/1982 |
| DE | 38 24 972 | 1/1989 |
| DE | 100 29147 | 12/2001 |
| DE | 200 16 655 | 3/2002 |
| DE | 102 21 484 | 11/2003 |
| DE | 103 04584 | 8/2004 |
| DE | 10 2005 036290 | 2/2007 |
| DE | 102006044057 | 4/2008 |
| EP | 1 296 407 | 3/2003 |
| EP | 1335477 | 8/2003 |
| EP | 1 521 206 | 4/2005 |
| EP | 1 524 010 | 4/2005 |
| GB | 2 307 379 | 5/1997 |
| JP | 61-159804 | 7/1986 |
| JP | 02-097005 | 4/1990 |
| JP | 4-265875 | 9/1992 |
| JP | 6-341410 | 12/1994 |
| JP | 7-50508 | 2/1995 |
| JP | 9-147070 | 6/1997 |
| JP | 9-182323 | 7/1997 |
| JP | 9-298847 | 11/1997 |
| JP | 10-84304 | 3/1998 |
| JP | 10-164837 | 6/1998 |
| JP | 11-25238 | 1/1999 |
| JP | 11-75329 | 3/1999 |
| JP | 11-155245 | 6/1999 |
| JP | 11-188113 | 7/1999 |
| JP | 2001-309580 | 11/2001 |
| JP | 2002-10535 | 1/2002 |
| JP | 2002-508916 | 3/2002 |
| JP | 2003-179526 | 6/2003 |
| JP | 2004-166459 | 6/2004 |
| JP | 2004-201458 | 7/2004 |
| JP | 2005-57444 | 3/2005 |
| JP | 2005-149238 | 6/2005 |
| JP | 2006-074848 | 3/2006 |
| JP | 2007-505480 | 3/2007 |
| JP | 2007-537637 | 12/2007 |
| JP | 2009-501510 | 1/2009 |
| JP | 2012-105537 | 5/2012 |
| KR | 2000-0046258 | 7/2000 |
| KR | 10-2004-0072581 | 8/2004 |
| KR | 10-2007-0017804 | 2/2007 |
| SG | 112842 | 7/2005 |
| WO | WO 92/17929 | 10/1992 |
| WO | WO 93/23908 | 11/1993 |
| WO | WO 94/28560 | 12/1994 |
| WO | WO 95/11545 | 4/1995 |
| WO | WO 96/02970 | 2/1996 |
| WO | WO 98/50993 | 11/1998 |
| WO | WO 00/77910 | 12/2000 |
| WO | WO 03/036761 | 1/2003 |
| WO | WO 03/081324 | 10/2003 |
| WO | WO 03/092329 | 11/2003 |
| WO | WO 03/096361 | 11/2003 |
| WO | WO 03/096512 | 11/2003 |
| WO | WO 2004/015885 | 2/2004 |
| WO | WO 2004/038888 | 5/2004 |
| WO | WO 2004/055654 | 7/2004 |
| WO | WO 2004/073150 | 8/2004 |
| WO | WO 2004/073166 | 8/2004 |
| WO | WO 2004/073176 | 8/2004 |
| WO | WO 2004/073177 | 8/2004 |
| WO | WO 2004/112216 | 12/2004 |
| WO | WO 2005/024865 | 3/2005 |
| WO | WO 2005/060068 | 6/2005 |
| WO | WO 2005/109597 | 11/2005 |
| WO | WO 2005/109598 | 11/2005 |
| WO | WO 2005/124962 | 12/2005 |
| WO | WO 2006/011769 | 2/2006 |
| WO | WO 2007/008646 | 1/2007 |
| WO | WO 2007/020583 | 2/2007 |
| WO | WO 2007/042952 | 4/2007 |
| WO | WO 2007/075058 | 7/2007 |
| WO | WO 2007/084716 | 7/2007 |
| WO | WO 2007/084717 | 7/2007 |
| WO | WO 2008/109489 | 9/2008 |
| WO | WO 2008/118178 | 10/2008 |
| WO | WO 2009/009559 | 1/2009 |
| WO | WO 2009/018568 | 2/2009 |
| WO | WO 2009/023155 | 2/2009 |
| WO | WO 2009/023646 | 2/2009 |
| WO | WO 2009/033043 | 3/2009 |
| WO | WO 2009/070730 | 6/2009 |
| WO | WO 2009/140506 | 11/2009 |
| WO | WO 2010/030977 | 3/2010 |
| WO | WO 2010/039967 | 4/2010 |
| WO | WO 2010/090538 | 8/2010 |
| WO | WO 2010/090539 | 9/2010 |
| WO | WO 2011/062827 | 5/2011 |

OTHER PUBLICATIONS

"Intel Moves to Free Gadgets of Their Recharging Cords", By John Markoff, The New York Times—nytimes.com, Aug. 21, 2008.
"Physics Update, Unwired Energy", *Physics Today*, pp. 26, (Jan. 2007) (See http://arxiv.org/abs/physics/0611063.).
"Unwired energy questions asked, answered", *Physics Today*, pp. 16-17 (Sep. 2007).
"Wireless Energy Transfer Can Potentially Recharge Laptops, Cell Phones Without Cords", by Marin Soljacic of Massachusetts Institute of Technology and Davide Castelvecchi of American Institute of Physics (Nov. 14, 2006).
"'Evanescent coupling' could power gadgets wirelessly" by Celeste Biever, NewScientistsTech.com, (see http://www.newscientisttech.com/article.ns?id=dn10575&print=true) (Nov. 15, 2006).
"Air Power—Wireless data connections are common—now scientists are working on wireless power", by Stephen Cass, Sponsored by Spectrum, (See http://spectrum.ieee.org/computing/hardware/air-power) (Nov. 2006).
"Automatic Recharging, From a Distance" by Anne Eisenberg, The New York Times, (see www.nytimes.com/2012/03/11/business/built-in-wireless-chargeing-for-electronic-devices.html?_r=0) (published on Mar. 10, 2012).
"Electro-nirvana? Not so fast", by Alan Boyle, *MSNBC*, (Jun. 8, 2007).
"How Wireless Charging Will Make Life Simpler (and Greener)" by David Ferris, Forbes (See forbes.com/sites/davidferris/2012/07/24/how-wireless-charging-will-make-life-simpler-and-greener/print/) (dated Jul. 24, 2012).
"In pictures: A year in technology", *BBC News*, (Dec. 28, 2007).
"Lab report: Pull the plug for a positive charge", by James Morgan, *The Herald*, Web Issue 2680 (Nov. 16, 2006).
"Look, Ma—no wires!—Electricity broadcast through the air may someday run your home", by Gregory M. Lamb, Staff writer, The Christian Science Monitor, (See http://www.csmonitor.com/2006/1116/p14s01-stct.html) (Nov. 15, 2006).
"Man tries wirelessly boosting batteries", by Seth Borenstein, AP Science Writer, Boston.com, (See http://www.boston.com/business/technology/articles/2006/11/15/man_tries_wirelessly_b . . . ) (Nov. 15, 2006).
"Man tries wirelessly boosting batteries", by Seth Borenstein, The Associated Press, *USA Today*, (Nov. 16, 2006).
"MIT discovery could unplug your iPod forever", by Chris Reidy, Globe staff. Boston.com, (See http://www.boston.com/business/ticker/2007/06/mit_discovery_c.html) (Jun. 7, 2007).
"MIT Scientists Pave the Way for Wireless Battery Charging", by William M. Bulkeley, The Wall Street Journal, (See http://online.wsj.com/article/SB118123955549228045.html?mod=googlenews_wsi) (Jun. 8, 2007).
"MIT's wireless electricity for mobile phones", by Miebi Senge, Vanguard, (See http://www.vanguardngr.com/articles/2002/features/gsm/gsm211062007.htm) (Jun. 11, 2007).

(56) References Cited

OTHER PUBLICATIONS

"Next Little Thing 2010 Electricity without wires", CNN Money (See money.cnn.com/galleries/2009/smallbusiness/0911/gallery.next_little_thing_2010.smb/) (dated Nov. 30, 2009).
"Outlets Are Out", by Phil Berardelli, ScienceNOW Daily News. Science Now, (See http://sciencenow.sciencemag.org/cgi/content/full/2006/1114/2) (Nov. 14, 2006).
"Physics Promises Wireless Power" by Jonathan Fildes, Science and Technology Reporter, BBC News, (Nov. 15, 2006).
"Recharging gadgets without cables", Infotech Online, Printed from infotech.indiatimes.com (Nov. 17, 2006).
"Recharging, The Wireless Way—Even physicists forget to recharge their cell phones sometimes." By Angela Chang—PC Magazine, ABC News Internet Ventures, (2006).
"Scientists light bulb with 'wireless electricity'", www.Chinaview.cn, (See http://news.xinhuanet.com/english/2007-06/08/content_6215681.htm) (Jun. 2007).
"The Big Story for CES 2007: The public debut of eCoupled Intelligent Wireless Power" Press Release, Fulton Innovation LLC, Las Vegas, NV, Dec. 27, 2006.
"The end of the plug? Scientists invent wireless device that beams electricity through your home", by David Derbyshire, Daily Mail, (See http://www.dailymail.co.uk/pages/live/articles/technology/technology.html?in_article_id=4 . . . ) (Jun. 7, 2007).
"The Power of Induction—Cutting the last cord could resonate with our increasingly gadget-dependent lives", by Davide Castelvecchi, Science News Online, vol. 172, No. 3, (Week of Jul. 21, 2007).
"The technology with impact 2007", by Jonathan Fildes, BBC News, (Dec. 27, 2007).
"The vision of an MIT physicist: Getting rid of pesky rechargers" by Gareth Cooks, Globe Staff, Boston.com, (Dec. 11, 2006).
"The world's first sheet-type wireless power transmission system: Will a socket be replaced by e-wall?" Press Release, Tokyo, Japan, Dec. 12, 2006.
"Wireless charging—the future for electric cars?" by Katia Moskvitch, BBC News Technology (See www.bbc.co.uk/news/technology-14183409) (dated Jul. 21, 2011).
"Wireless Energy Lights Bulb from Seven Feet Away—Physicists vow to cut the cord between your laptop battery and the wall socket—with just a simple loop of wire", by JR Minkel, ScientificAmerican.com, (See http://www.sciam.com/article.cfm?articleid=07511C52-E7F2-99DF-3FA6ED2D7DC9AA2 . . . ) (Jun. 7, 2007).
"Wireless energy promise powers up" by Jonathan Fildes. Science and Technology Report. BBC News, (See http://news.bbc.co.uk/2/hi/technology/6725955.stm) (Jun. 7, 2007).
"Wireless Energy Transfer May Power Devices at a Distance", ScientificAmerican.com, (Nov. 14, 2006).
"Wireless Energy", by Clay Risen, The New York Times, (Dec. 9, 2007).
"Wireless power transfer possible", PressTV, (See http://www.presstv.ir/detail.aspx?id=12754&sectionid=3510208) (Jun. 11, 2007).
"Wireless revolution could spell end of plugs", by Roger Highfield, Science Editor, Telegraph.co.uk, (See http://www.telegraph.co.uk/news/main.ihtml?xml=/news/2007/06/07/nwireless107.xml) (Jun. 7, 2007).
A. Mediano et al. "Design of class E amplifier with nonlinear and linear shunt capacitances for any duty cycle", IEEE Trans. Microwave Theor. Tech., vol. 55, No. 3, pp. 484-492, (2007).
Abe et al. "A Noncontact Charger Using a Resonant Converter with Parallel Capacitor of the Secondary Coil". IEEE, 36(2):444-451, Mar./Apr. 2000.
Ahmadian et al., "Miniature Transmitter for Implantable Micro Systems", Proceedings of the 25th Annual International Conference of the IEEE EMBS Cancun, Mexico, pp. 3028-3031, Sep. 17-21, 2003.
Aiguo Patrick Hu, "Selected Resonant Converters for IPT Power Supplies", Thesis submitted to the Department of Electrical and Electronic Engineering for the University of Auckland, New Zealand (Oct. 2001).

Altchev et al. "Efficient Resonant Inductive Coupling Energy Transfer Using New Magnetic and Design Criteria". IEEE, pp. 1293-1298, 2005.
Amnon Yariv et al., "Coupled-resonator optical waveguide: a proposal and analysis", Optics Letters, vol. 24, No. 11, pp. 711-713 (Jun. 1, 1999).
Andre Kurs et al., "Wireless Power Transfer via Strongly Coupled Magnetic Resonances", Science vol. 317, pp. 83-86 (Jul. 6, 2007).
Andre Kurs et al., "Simultaneous mid-range power transfer to multiple devices", Applied Physics Letters, vol. 96, No. 044102 (2010).
Apneseth et al. "Introducing wireless proximity switches" ABB Review Apr. 2002.
Aristeidis Karalis et al., "Efficient Wireless non-radiative mid-range energy transfer", Annals of Physics, vol. 323, pp. 34-48 (2008).
Arthur W. Kelley et al., "Connectorless Power Supply for an Aircraft-Passenger Entertainment System", IEEE Transactions on Power Electronics, vol. 4, No. 3, pp. 348-354 (Jul. 1989).
Australian Office Action, Application No. 2006269374; dated Sep. 18, 2008; Applicant: Massachusetts Institute of Technology; 3 pages.
Australian Office Action, Application No. 2007349874; dated Apr. 27, 2011; Applicant: Massachusetts Institute of Technology; 3 pages.
Australian Office Action, Application No. 2009246310; dated Jun. 13, 2013; Applicant: Massachusetts Institute of Technology; 2 pages.
Australian Office Action, Application No. 2010200044; dated May 16, 2011; Applicant: Massachusetts Institute of Technology; 2 pages.
Australian Office Action, Application No. 2011203137; dated Apr. 18, 2013; Applicant: Massachusetts Institute of Technology; 3 pages.
Australian Office Action, Application No. 2011232776; dated Dec. 2, 2011; Applicant: Massachusetts Institute of Technology; 2 pages.
Australian Office Action, Application No. 2011232776; dated Feb. 15, 2013; Applicant: Massachusetts Institute of Technology; 3 pages.
B. E. Little, et al., "Microring Resonator Channel Dropping Filters", Journal of Lightwave Technology, vol. 15, No. 6, pp. 998-1005 (Jun. 1997).
Baker et al., "Feedback Analysis and Design of RF Power Links for Low-Power Bionic Systems," IEEE Transactions on Biomedical Circuits and Systems, 1(1):28-38 (Mar. 2007).
Balanis, C.A., "Antenna Theory: Analysis and Design," 3rd Edition, Sections 4.2, 4.3, 5.2, 5.3 (Wiley, New Jersey, 2005).
Benjamin L. Cannon, et al., "Magnetic Resonant Coupling as a Potential Means for Wireless Power Transfer to Multiple Small Receivers", IEEE Transactions on Power Electronics, vol. 24, No. 7, pp. 1819-1825 (Jul. 2009).
Bladel, "Weakly Coupled Dielectric Resonators", IEEE Transactions on Microwave Theory and Techniques, vol. 30, No. 11, pp. 1907-1914 (Nov. 1982).
Burri et al. "Invention Description" Feb. 5, 2008.
C. Fernandez et al., "A simple dc-dc converter for the power supply of a cochlear implant", IEEE, pp. 1965-1970 (2003).
Canadian Office Action, Application No. 2,615,123; dated Nov. 15, 2012; Applicant: Massachusetts Institute of Technology; 4 pages.
Canadian Office Action, Application No. 2,682,284; dated Feb. 25, 2015 Applicant: Massachusetts Institute of Technology; 4 pages.
Canadian Office Action, Application No. 2,682,284; dated Nov. 25, 2013; Applicant: Massachusetts Institute of Technology; 3 pages.
Chinese Office Action, Application No. 200680032299.2; dated Jan. 22, 2010; Applicant: Massachusetts Institute of Technology; 5 pages.
Chinese Office Action, Application No. 200680032299.2; dated Jun. 4, 2012; Applicant: Massachusetts Institute of Technology; 5 pages.
Chinese Office Action, Application No. 200680032299.2; dated Oct. 17, 2011; Applicant: Massachusetts Institute of Technology; 9 pages.
Chinese Office Action, Application No. 200780053126.3; dated Aug. 6, 2012; Applicant: Massachusetts Institute of Technology; 11 pages.

(56) References Cited

OTHER PUBLICATIONS

Chinese Office Action, Application No. 200780053126.3; dated Dec. 19, 2012; Applicant: Massachusetts Institute of Technology; 8 pages.
Chinese Office Action, Application No. 200780053126.3; dated Oct. 27, 2011; Applicant: Massachusetts Institute of Technology; 6 pages.
Chinese Office Action, Application No. 200980127634.0; dated Apr. 2, 2013; Applicant: Massachusetts Institute of Technology; 11 pages.
Chinese Office Action, Application No. 201010214681.3; dated Feb. 13, 2012; Applicant: Massachusetts Institute of Technology; 4 pages.
Chinese Office Action, Application No. 201010214681.3; dated Jan. 26, 2011; Applicant: Massachusetts Institute of Technology; 7 pages.
Chinese Office Action, Application No. 201010214681.3; dated May 29, 2012; Applicant: Massachusetts Institute of Technology; 4 pages.
Chinese Office Action, Application No. 201010214681.3; dated Nov. 2, 2011; Applicant: Massachusetts Institute of Technology; 7 pages.
Chinese Office Action, Application No. 201010214681.3; dated Oct. 10, 2012; Applicant: Massachusetts Institute of Technology; 3 pages.
Chinese Office Action, Application No. 201110185992.6; dated Apr. 11, 2012; Applicant: Massachusetts Institute of Technology; 5 pages.
Chinese Office Action, Application No. 201110185992.6; dated Jan. 4, 2013; Applicant: Massachusetts Institute of Technology; 10 pages.
Chinese Office Action, Application No. 201110311000.X; dated Dec. 6, 2013; Applicant: Massachusetts Institute of Technology; 20 pages.
Chinese Office Action, Application No. 201110311000.X; dated Jun. 18, 2013; Applicant: Massachusetts Institute of Technology; 20 pages.
Chinese Office Action, Application No. 201310280724.1; dated Jun. 16, 2015; Applicant: Massachusetts Institute of Technology (7 pages).
Clemens M. Zierhofer et al., "High-Efficiency Coupling-Insensitive Transcutaneous Power and Data Transmission Via an Inductive Link", *IEEE Transactions on Biomedical Engineering*, vol. 37, No. 7, pp. 716-722 (Jul. 1990).
Australia Patent Examination Report No. 2 for Australian Patent Application No. 2009246310 dated Aug. 21, 2014 (3 Pages).
Australian Patent Examination Report No. 1 for Australian Patent Application No. 2013203919 dated Apr. 14, 2014.
Chinese Office Action for Chinese Application No. 201210472059.1 dated Jan. 29, 2015 (13 pages).
Chinese Office Action for Chinese Application No. 201210472059.1 dated Jun. 5, 2014 (54 pages).
Chinese Office Action for Chinese Application No. 201310098809.8 dated Mar. 2, 2015 (10 pages).
Chinese Office Action for Chinese Application No. 201310585104.9 dated Mar. 2, 2015 (10 Pages).
Chinese Office Action for Chinese Patent Application No. 201110311000.X dated Jan. 19, 2015 (6 pages).
Chinese Office Action for Chinese Patent Application No. 201310280724.1 dated Oct. 8, 2014 (20 pages).
Communication from the European Patent Office for Patent Application No. 06 786 588.1 dated Oct. 20, 2014 (6 pages).
Communication from the European Patent Office for Patent Application No. 11 184 066.6 dated Oct. 20, 2014 (7 pages).
Decision to Refuse a European Patent Application for European Application No. EP 06 786 588.1 by Chairman Alan Davis dated Sep. 30, 2016 (71 pages).
Decision to Refuse a European Patent Application for European Application No. EP 11 184 066.6 by Chairman Alan Davis dated Sep. 30, 2016 (38 pags).

European Communication for Application No. 06786588.1 dated Aug. 20, 2014 (23 pages).
European Patent Office Communication for European Patent Application No. 06786588.1 dated Jun. 17, 2016 (3 pages).
European Search Report for European Application No. 11150603 dated May 23, 2017 (9 pages).
European Search Report with regard to Application Serial No. 11184066.6 dated Mar. 20, 2013.
Examination Report for Australia Application No. 2006269374, dated Sep. 18, 2008.
Extended Search Report for European Application No. 11 15 0602 dated May 31, 2017.
Final Office Action for U.S. Appl. No. 13/477,459 dated Sep. 22, 2015 (18 pages).
Final Office Action for U.S. Appl. No. 13/789,860 dated Nov. 20, 2015 (23 pages).
Final Office Action with regard to U.S. Appl. No. 12/639,958 dated Jun. 6, 2013 (18 pages).
Final Office Action with regard to U.S. Appl. No. 12/639,963 dated Jun. 18, 2013 (16 pages).
Final Office Action with regard to U.S. Appl. No. 12/649,635 dated Jun. 20, 2013 (20 pages).
Final Office Action with regard to U.S. Appl. No. 12/649,777 dated Jun. 26, 2013 (17 pages).
Final Office Action with regard to U.S. Appl. No. 12/649,813 dated Jun. 24, 2013 (17 pages).
Final Office Action with regard to U.S. Appl. No. 12/649,852 dated Jun. 27, 2013 (19 pages).
Final Office Action with regard to U.S. Appl. No. 12/649,904 dated Sep. 26, 2013 (23 pages).
Final Office Action with regard to U.S. Appl. No. 12/639,966 dated Oct. 9, 2012 (20 pages).
Final Office Action with regard to U.S. Appl. No. 12/639,967 dated Oct. 5, 2012 (21 pages).
First Examination Report from the Indian Patent Office for Indian Patent Application No. 6195/DELNP/2009 dated Feb. 9, 2017.
International Preliminary Report on Patentability for International Application No. PCT/US2006/026480, dated Jan. 29, 2008.
International Preliminary Report on Patentability with regard to International Application No. PCT/US2007/070892 dated Sep. 29, 2009.
International Search Report and Written Opinion for International Application No. PCT/US09/43970, dated Jul. 14, 2009.
International Search Report and Written Opinion for International Application No. PCT/US2006/026480, dated Dec. 21, 2007.
International Search Report and Written Opinion for International Application No. PCT/US2007/070892, dated Mar. 3, 2008.
International Search Report and Written Opinion of the International Searching Authority for International Application No. PCT/US2011/027868 dated Jul. 5, 2011.
International Search Report for International Application No. PCT/US09/58499 dated Dec. 10, 2009.
Japanese Office Action for Japanese Application No. 2011-509705 dated Jul. 1, 2014 (28 pages).
Japanese Office Action for Japanese Office Action No. 2013-223597 dated Nov. 17, 2015 (8 pages).
Japanese Office Action for Japanese Patent Application No. 2014-084540 dated Feb. 10, 2015 (18 pages).
Japanese Office Action for Japanese Patent Application No. 2016-093460 dated May 23, 2017.
Japanese Office Action for Patent Application No. 2013-223597 dated Nov. 11, 2014 (16 pages).
Korean Office Action for Korean Application No. 10-2009-7022442 by the Examination Bureau of the Korean Intellectual Property Office dated Oct. 18, 2012.
Korean Office Action for Korean Application No. 10-2011-7023643 by the Examination Bureau of the Korean Intellectual Property Office dated Oct. 23, 2012.
Korean Office Action for Patent Application No. 10-2011-7023643 from the Examination Bureau of the Korean Intellectual Property Office dated Sep. 26, 2014 (7 pages).
Non-Final Office Action for U.S. Appl. No. 12/639,963 dated Feb. 27, 2014 (19 pages).

(56) References Cited

OTHER PUBLICATIONS

Non-Final Office Action for U.S. Appl. No. 12/648,604 dated Dec. 5, 2011.
Non-Final Office Action for U.S. Appl. No. 12/649,635 dated Feb. 27, 2014 (18 pages).
Non-Final Office Action for U.S. Appl. No. 12/649,777 dated Feb. 26, 2014 (16 pages).
Non-Final Office Action for U.S. Appl. No. 12/649,813 dated Feb. 27, 2014 (16 pages).
Non-Final Office Action for U.S. Appl. No. 12/649,852 dated Feb. 27, 2014 (17 pages).
Non-Final Office Action for U.S. Appl. No. 12/726,742 dated May 11, 2012.
Non-Final Office Action for U.S. Appl. No. 13/030,395 dated May 17, 2012.
Non-Final Office Action for U.S. Appl. No. 13/036,177 dated May 15, 2012.
Non-Final Office Action for U.S. Appl. No. 13/040,810 dated May 17, 2012.
Non-Final Office Action for U.S. Appl. No. 13/078,511 dated May 15, 2012.
Non-Final Office Action for U.S. Appl. No. 13/477,459 dated Mar. 12, 2015 (62 pages).
Non-Final Office Action for U.S. Appl. No. 13/789,860 dated Mar. 13, 2015 (51 pages).
Non-Final Office Action for U.S. Appl. No. 14/302,662 dated Mar. 12, 2015 (42 pages).
Non-Final Office Action for U.S. Appl. No. 14/666,683 dated Aug. 17, 2015 (42 pages).
Non-Final Office Action with regard to U.S. Appl. No. 12/949,580 dated Jun. 17, 2013 (55 pages).
Non-Final Office Action with regard to U.S. Appl. No. 12/415,667 dated Oct. 5, 2012 (20 pages).
Non-Final Office Action with regard to U.S. Appl. No. 12/639,958 dated Aug. 16, 2012 (21 pages).
Non-Final Office Action with regard to U.S. Appl. No. 12/639,963 dated Aug. 31, 2012 (20 pages).
Non-Final Office Action with regard to U.S. Appl. No. 12/646,524 dated Oct. 1, 2012 (11 pages).
Non-Final Office Action with regard to U.S. Appl. No. 12/649,635 dated Dec. 21, 2012 (41 pages).
Non-Final Office Action with regard to U.S. Appl. No. 12/649,777 dated Dec. 24, 2012 (43 pages).
Non-Final Office Action with regard to U.S. Appl. No. 12/649,813 dated Dec. 21, 2012 (40 pages).
Non-Final Office Action with regard to U.S. Appl. No. 12/649,852 dated Dec. 21, 2012 (41 pages).
Non-Final Office Action with regard to U.S. Appl. No. 12/649,904 dated Dec. 28, 2012 (43 pages).
Non-Final Office Action with regard to U.S. Appl. No. 12/868,852 dated Oct. 10, 2012 (26 pages).
Non-Final Office Action with regard to U.S. Appl. No. 12/949,544 dated Sep. 5, 2012 (41 pages).
Notice of Allowance from the U.S. Patent and Trademark Office for U.S. Appl. No. 13/477,459 dated Mar. 31, 2016 (13 pages).
PCT International Search Report and Written Opinion for PCT/US09/59244, dated Dec. 7, 2009, 12 pages.
U.S. Appl. No. 60/908,383, filed Mar. 27, 2007.
Submission of Publication to the Japanese Patent Office for Japanese Application No. 2011-256,729.
Submission of Publication to the Japanese Patent Office for Japanese Application No. 2011-509,705.
Summons to Attend Oral Proceedings for Application No. 06 786 588.1 dated Feb. 4, 2016 (31 pages).
Summons to Attend Oral Proceedings for Application No. 11 184 066.6 dated Feb. 8, 2016 (17 pages).
Translation of Information Statement by Third Party submitted to the Japanese Patent Office for Japanese Application No. 2011-83009.

Covic et al., "Inductive Power Transfer", *Proceedings of the IEEE*, vol. 101, No. 6, pp. 1276-1289 (Jun. 2013).
Covic et al., "Modern Trends in Inductive Power Transfer for Transportation Applications", *IEEE Journal of Emerging and Selected Topics in Power Electronics*, vol. 1, No. 1, pp. 28-41 (Mar. 2013).
D.H.Freedman. "Power on a Chip". MIT Technology Review, Nov. 2004.
David H. Staelin et al., *Electromagnetic Waves*, Chapters 2, 3, 4, and 8, pp. 46-176 and 336-405 (Prentice Hall Upper Saddle River, New Jersey 1998).
David Schneider, "A Critical Look at Wireless Power", *IEEE Spectrum*, (May 2010).
David Schneider, "Wireless Power at a distance is still far away", A Critical Look at Wireless Power—IEEE Spectrum, http://spectrum.ieee.org/transportation/mass-transit/a-critical-look-at-wireless-power, (Apr. 30, 2010) (7 pages).
David Vilkomerson et al., "Implantable Doppler System for Self-Monitoring Vascular Grafts", *IEEE Ultrasonics Symposium*, pp. 461-465 (2004).
De Beoij et al., "Contactless Energy Transfer to a Moving Load Part I: Topology Synthesis and FEM simulation", *IEEE ISIE*, Montreal, Quebec Canada, pp. 739-744 (Jul. 9-12, 2006).
De Beoij et al., "Contactless Energy Transfer to a Moving Load Part II: Simulation of Electrical and Mechanical Transient", *IEEE ISIE*, Montreal, Quebec Canada, pp. 745-750 (Jul. 9-12, 2006).
Electricity Unplugged, Feature: Wireless Energy, *Physics World*, pp. 23-25 (Feb. 2009).
EPO Office Action for EP Application No. 07 784 396.9 dated Nov. 7, 2016 (5 pages).
Esser et al. "A New Approach to Power Supplies for Robots". IEEE, 27(5):872-875, Sep./Oct. 1991.
European Examination Report dated Jan. 15, 2009 in connection with Application No. 06 786 588.1-1242.
European Office Action, Application No. 06 786 588.1; dated Apr. 24, 2013; Applicant: Massachusetts Institute of Technology; 4 pages.
European Office Action, Application No. 06 786 588.1; dated Dec. 3, 2013; Applicant: Massachusetts Institute of Technology; 6 pages.
European Office Action, Application No. 06 786 588.1; dated Jan. 15, 2009; Applicant: Massachusetts Institute of Technology; 5 pages.
European Office Action, Application No. 11 184 066.6; dated Dec. 3, 2013; Applicant: Massachusetts Institute of Technology; 5 pages.
F. Turki, "A wireless battery charger concept with lightweight and low cost vehicle equipment: eCPS," in Proc. Conference on Electric Roads & Vehicles, Feb. 2013, pp. 1-21.
Faria, J. A. Brandao, "Poynting Vector Flow Analysis for Contactless Energy Transfer in Magnetic Systems", *IEEE Transactions on Power Electronics*, vol. 27, No. 10, pp. 4292-4300 (Oct. 2012).
Fenn et al., "Linear Array Characteristics with One-Dimensional Reactive-Region Near-Field Scanning: Simulations and Measurements", *IEEE Transactions on Antennas and Propagation*, vol. 39, No. 9, pp. 1305-1311 (Sep. 1991).
Fenske et al. "Dielectric Materials at Microwave Frequencies". Applied Microwave & Wireless, pp. 92-100, 2000.
Fildes, Jonathan, "Wireless Energy Promise Powers Up", BBC News, Jun. 7, 2007 (See http://news.bbc.co.uk/2/hi/6725955.stm ).
Finkenzeller, Klaus, RFID Handbook—Fundamentals and Applications in Contactless Smart Cards-, Nikkan Kohgyo-sya, Kanno Taihei, first version, pp. 32-37, 253 (Aug. 21, 2001).
Fumiaki Nakao et al., "Ferrite Core Couplers for Inductive Chargers", *IEEE, PCC-Osaka* 2002, pp. 850-854 (2002).
G. Scheible et al., "Novel Wireless Power Supply System for Wireless Communication Devices in Industrial Automation Systems", *IEEE*, (2002).
Gary Peterson, "MIT WiTricity Not So Original After All", Feed Line No. 9, (See http://www.tfcbooks.com/articles/witricity.htm) printed Nov. 12, 2009.
Geyi, Wen. A Method for the Evaluation of Small Antenna Q. IEEE Transactions on Antennas and Propagation, vol. 51, No. 8, Aug. 2003.

(56) References Cited

OTHER PUBLICATIONS

GuoMin Zhang, et al., "Wireless Power Transfer Using High Temperature Superconducting Pancake Coils", *IEEE Transactions on Applied Superconductivity*, vol. 24, No. 3 (Jun. 2014) (5 pages).
Guoxing Wang et al., "Power Supply Topologies for Biphasic Stimulation in Inductively Powered Implants", *IEEE*, pp. 2743-2746 (2005).
Gurhan Alper Kendir et al., "An Efficient Inductive Power Link Design for Retinal Prosthesis", *IEEE*, ISCAS 2004, pp. IV-41-IV-44 (2004).
H. Sekiya et al. "FM/PWM control scheme in class DE inverter", IEEE Trans. Circuits Syst. I, vol. 51, No. 7 (Jul. 2004).
Haus et al., "Coupled-Mode Theory", *Proceedings of the IEEE*, vol. 79, No. 10, pp. 1505-1518 (Oct. 1991).
Haus, H.A., "Waves and Fields in Optoelectronics," Chapter 7 "Coupling of Modes—Resonators and Couplers" (Prentice-Hall, New Jersey, 1984).
Heikkinen et al. "Performance and Efficiency of Planar Rectennas for Short-Range Wireless Power Transfer at 2.45 GHz". Microwave and Optical Technology Letters, 31(2):86-91, Oct. 20, 2001.
Hirai et al. "Integral Motor with Driver and Wireless Transmission of Power and Information for Autonomous Subspindle Drive". IEEE, 15(1):13-20, Jan. 2000.
Hirai et al. "Practical Study on Wireless Transmission of Power and Information for Autonomous Decentralized Manufacturing System". IEEE, 46(2):349-359, Apr. 1999.
Hirai et al. "Study on Intelligent Battery Charging Using Inductive Transmission of Power and Information". IEEE, 15(2):335-345, Mar. 2000.
Hirai et al. "Wireless Transmission of Power and Information and Information for Cableless Linear Motor Drive". IEEE 15(1):21-27, Jan. 2000.
Ho et al., "A Comparative Study Between Novel Witricity and Traditional Inductive Magnetic Coupling in Wireless Charging", IEEE Transactions on Magnetics, vol. 47, No. 5, pp. 1522-1525 (May 2011).
Hui et al., "A Critical Review of Recent Progress in Mid-Range Wireless Power Transfer", *IEEE Transactions on Power Electronics*, vol. 29, No. 9, pp. 4500-4511 (Sep. 2014).
J. B. Pendry. "A Chiral Route to Negative Refraction". Science 306:1353-1355 (2004).
J. Meins, "Inductive Power Transfer Basics, Design Optimizations, Applications", *Conference on Electric Roads & Vehicles*, Institute for Electrical Machines, Traction and Drives, Technical University of Braunschweig, Park City, Utah (Feb. 4-5, 2013) (42 pages).
J. Schutz et al., "Load Adaptive Medium Frequency Resonant Power Supply", *IEEE*, (2002).
J.T. Boys et al., "Stability and control of inductively coupled power transfer systems", *IEE Proc. Electr. Power Appl.*, vol. 147, No. 1, pp. 37-43 (Jan. 2000).
Jackson, J. D. ,"Classical Electrodynamics",3rd Edition, Wiley, New York,1999,pp. 201-203.
Jackson, J.D., "Classical Electrodynamics," 3rd Edition, Sections 1.11, 5.5, 5.17, 6.9, 8.1, 8.8, 9.2, 9.3 (Wiley, New York, 1999).
Japanese Office Action, Application No. 2008-521453; dated Jan. 4, 2011; Applicant: Massachusetts Institute of Technology; 3 pages.
Japanese Office Action, Application No. 2010-500897; dated May 29, 2012; Applicant: Massachusetts Institute of Technology; 7 pages.
Japanese Office Action, Application No. 2011-083009; dated Jul. 2, 2013; Applicant: Massachusetts Institute of Technology; 5 pages.
Japanese Office Action, Application No. 2011-256729; dated May 28, 2013; Applicant: Massachusetts Institute of Technology; 7 pages.
Japanese Office Action, Application No. 2011-509705; dated Jul. 16, 2013; Applicant: Massachusetts Institute of Technology; 10 pages.
John C. Schuder "Powering an Artificial Heart: Birth of the Inductively Coupled-Radio Frequency System in 1960", Artificial Organs, vol. 26, No. 11, pp. 909-915 (2002).

John C. Schuder et al., "An Inductively Coupled RF System for the Transmission of 1 kW of Power Through the Skin", IEEE Transactions on Bio-Medical Engineering, vol. BME-18, No. 4 (Jul. 1971).
John M. Miller et al., "Elements of Wireless Power Transfer Essential to High Power Charging of Heavy Duty Vehicles", *IEEE Transactions on Transportation Electrification*, vol. 1, No. 1, pp. 26-39 (Jun. 2015).
John T. Boys et al., "The Inductive Power Transfer Story at the University of Auckland", *IEEE Circuits and Systems Magazine*, Second Quarter 2015, pp. 6-27 (May 21, 2015).
Joseph C. Stark III, "Wireless Power Transmission Utilizing a Phased Array of Tesla Coils", Master Thesis, Massachusetts Institute of Technology (2004).
Joyce K. S. Poon, et al., "Designing coupled-resonator optical waveguide delay lines", *J. Opt. Soc. Am. B*, vol. 21, No. 9, pp. 1665-1673 (Sep. 2004).
Juan C. Olivares-Galvan et al., "Wireless Power Transfer: Literature Survey", *Power, Electronics and Computing (ROPEC)*, 2013 IEEE International Autumn Meeting on Nov. 13-15, 2013, Mexico City, (2013) (7 pages).
K. Kanelis et al., "Maximum Efficiency in Non-Radiative Wireless Power Transfer", companion paper for *Wireless Power Congress*, Munich, Germany (Jul. 12-13, 2017) (8 pages).
K. Kanelis et al., "Maximum Efficiency in Non-Radiative Wireless Power Transfer", *Wireless Power Congress*, Munich, Germany (Jul. 12-13, 2017) (28 pages).
Kawamura et al. "Wireless Transmission of Power and Information Through One High-Frequency Resonant AC Link Inverter for Robot Manipulator Applications". IEEE, 32(3):503-508, May/Jun. 1996.
Klaus Finkenzeller, "RFID Handbook (2nd Edition)", The Nikkan Kogyo Shimbun, Ltd., pp. 19, 20, 38, 39, 43, 44, 62, 63, 67, 68, 87, 88, 291, 292 (Published on May 31, 2004).
Korean Office Action, Application No. 10-2008-7003376; dated Mar. 7, 2011; Applicant: Massachusetts Institute of Technology; 3 pages.
Korean Office Action, Application No. 10-2009-7022442; dated Jan. 31, 2013; Applicant: Massachusetts Institute of Technology; 6 pages.
Korean Office Action, Application No. 10-2009-7022442; dated Oct. 18, 2012; Applicant: Massachusetts Institute of Technology; 5 pages.
Korean Office Action, Application No. 10-2011-7013029; dated Aug. 9, 2011; Applicant: Massachusetts Institute of Technology; 4 pages.
Korean Office Action, Application No. 10-2011-7023643; dated Jan. 31, 2013; Applicant: Massachusetts Institute of Technology; 3 pages.
Korean Office Action, Application No. 10-2011-7023643; dated Oct. 23, 2012; Applicant: Massachusetts Institute of Technology; 5 pages.
Korean Office Action, Application No. 10-2013-7013521; dated Aug. 8, 2013; Applicant: Massachusetts Institute of Technology; 2 pages.
Korean Office Action, Application No. 10-2015-7005681; dated May 1, 2015; Applicant: Massachusetts Institute of Technology; 6 pages.
Lee, "Antenna Circuit Design for RFID Applications," Microchip Technology Inc., AN710, 50 pages (2003).
Lee, "RFID Coil Design," Microchip Technology Inc., AN678, 21 pages (1998).
Liang et al., "Silicon waveguide two-photon absorption detector at 1.5 μm wavelength for autocorrelation measurements," Applied Physics Letters, 81(7):1323-1325 (Aug. 12, 2002).
Liu, et al., "Determining the power distribution between two coupled coils based on Poynting vector analysis", *IEEE*, 6 pages, (Jun. 2017).
M. Chaoui et al, "Electrical Modeling of Inductive Links for High-Efficiency Energy Transmission", *Electronics, Circuits and Systems*, 2005. ICECS 2005. 12th IEEE International Conference, (Dec. 2005).

(56) References Cited

OTHER PUBLICATIONS

M. V. Jacob et al. "Lithium Tantalate—A High Permittivity Dielectric Material for Microwave Communication Systems". Proceedings of IEEE TENCON—Poster Papers, pp. 1362-1366, 2003.
Marin Soljacic et al., "Photonic-crystal slow-light enhancement of nonlinear phase sensitivity", *J. Opt. Soc. Am B*, vol. 19, No. 9, pp. 2052-2059 (Sep. 2002).
Marin Soljacic, "Wireless Non-Radiative Energy Transfer—PowerPoint Presentation", *Amazing Light: Visions for Discovery*, An International Symposium, Oct. 6-8, 2005, University of California, Berkeley (2005).
Marin Soljacic, "Wireless nonradiative energy transfer", *Visions of Discovery New Light on Physics, Cosmology, and Consciousness*, Cambridge University Press, New York, NY pp. 530-542 (2011).
Mickel Budhia et al., "Design and Optimization of Circular Magnetic Structures for Lumped Inductive Power Transfer Systems", *IEEE Transactions on Power Electronics*, vol. 26, No. 11, pp. 3096-3108 (Nov. 2011).
Mickel Budhia et al., "Development and evaluation of single sided flux couplers for contactless electric vehicle charging", *IEEE*, pp. 614-621 (2011).
Microchip Technology Inc., "microID 13.56 MHz Design Guide—MCRF355/360 Reader Reference Design," 24 pages (2001).
MIT Team Experimentally Demonstrates Wireless Power Transfer, Potentially Useful for Power Laptops, Cell-Phones Without Cords—Goodbye Wires . . . , by Franklin Hadley, Institute for Soldier Nanotechnologies, Massachusetts Institute of Technology (Jun. 7, 2007).
Nikola Tesla, "High Frequency Oscillators for Electro-Therapeutic and Other Purposes", *Proceedings of the IEEE*, vol. 87, No. 7, pp. 1282-1292 (Jul. 1999).
Nikola Tesla, "High Frequency Oscillators for Electro-Therapeutic and Other Purposes", *The Electrical Engineer*, vol. XXVI, No. 50 (Nov. 17, 1898).
O'Brien et al. "Analysis of Wireless Power Supplies for Industrial Automation Systems". IEEE, pp. 367-372, 2003.
O'Brien et al. "Design of Large Air-Gap Transformers for Wireless Power Supplies". IEEE, pp. 1557-1562, 2003.
Phil Schewe et al., "Berkeley Symposium Celebrates Laser Pioneer", *Physics News Update*, No. 749 #1, Oct. 13, 2005 (3 pages).
Powercast LLC. "White Paper" Powercast simply wire free, 2003.
R. Mecke et al., "High frequency resonant inverter for contactless energy transmission over large air gap", *2004 35th Annual IEEE Power Electronics Specialists Conference*, Aachen, Germany, pp. 1737-1743 (2004).
Rudolf Mecke et al., "Analysis of inductive energy transmission systems with large air gap at high frequencies", *European Conference on Power Electronics and Applications*, Toulouse 2003, (Jan. 2003).
S. Sensiper. Electromagnetic wave propogation on helical conductors. PhD Thesis, Massachusetts Institute of Technology, 1951.
Sakamoto et al. "A Novel Circuit for Non-Contact Charging Through Electro-Magnetic Coupling". IEEE, pp. 168-174, 1992.
Sekitani et al. "A large-area flexible wireless power transmission sheet using printed plastic MEMS switches and organic field-effect transistors". [Publication Unknown].
Sekitani et al. "A large-area wireless power-transmission sheet using printed organic transistors and plastic MEMS switches" www.nature.com/naturematerials. Published online Apr. 29, 2007.
Seung-Hwan Lee et al., "Development and Validation of Model for 95%-Efficiency 220-W Wireless Power Transfer Over a 30-cm Air Gap", *IEEE Transactions on Industry Applications*, vol. 47, No. 6, pp. 2495-2504 (Nov./Dec. 2011).
Shamonina et al., "Magneto-inductive waveguide", *Electronics Letters*, vol. 38, No. 8, pp. 371-373 (Apr. 11, 2002).
Shanhui Fan et al., "Rate-Equation Analysis of Output Efficiency and Modulation Rate of Photomic-Crystal Light-Emitting Diodes", IEEE Journal of Quantum Electronics, vol. 36, No. 10, pp. 1123-1130 (Oct. 2000).
Soljacic. "Wireless Non-Radiative Energy Transfer—PowerPoint presentation". Massachusetts Institute of Technology, Oct. 6, 2005.
Someya, Takao. "The world's first sheet-type wireless power transmission system". University of Tokyo, Dec. 12, 2006.
Splashpower, "Splashpower—World Leaders in Wireless Power," PowerPoint presentation, 30 pages (Sep. 3, 2007).
Stewart, Will, "The Power to Set you Free", Science, vol. 317, pp. 55-56 (Jul. 6, 2007).
Syms et al., "Magneto-inductive waveguide devices", *IEEE Proc.-Microw. Antennas Propag.*, vol. 153, No. 2., pp. 111-121 (Apr. 2006).
T. Aoki et al. "Observation of strong coupling between one atom and a monolithic microresonator". Nature 443:671-674 (2006).
Takahashi Ohira, "What in the World is Q?", *IEEE Microwave Magazine*, pp. 42-49 (Jun. 2016).
Takanashi et al., "A Large Air Gap 3 kW Wireless Power Transfer System for Electric Vehicles", *IEEE*, pp. 269-274 (2012).
Takehiro Imura, et al., "Maximizing Air Gap and Efficiency of Magnetic Resonant Coupling for Wireless Power Transfer Using Equivalent Circuit and Neumann Formula", *IEEE Transactions on Industrial Electronics*, vol. 58, No. 10, pp. 4746-4752 (Oct. 2011).
Tang, S.C et al.,"Evaluation of the Shielding Effects on Printed-Circuit-Board Transformers Using Ferrite Plates and Copper Sheets",IEEE Transactions on Power Electronics,vol. 17, No. 6,Nov. 2002.,pp. 1080-1088.
Texas Instruments, "HF Antenna Design Notes—Technical Application Report," Literature No. 11-08-26-003, 47 pages (Sep. 2003).
Thomsen et al., "Ultrahigh speed all-optical demultiplexing based on two-photon absorption in a laser diode," Electronics Letters, 34(19):1871-1872 (Sep. 17, 1998).
UPM Rafsec, "Tutorial overview of inductively coupled RFID Systems," 7 pages (May 2003).
Vandevoorde et al. "Wireless energy transfer for stand-alone systems: a comparison between low and high power applicability". Sensors and Actuators, A 92:305-311, 2001.
Villeneuve, Pierre R. et al.,"Microcavities in photonic crystals: Mode symmetry, tunability, and coupling efficiency",Physical Review B, vol. 54, No. 11 , Sep. 15, 1996,pp. 7837-7842.
Wang et al., "Load models and their application in the design of loosely coupled inductive power transfer systems", *IEEE*, pp. 1053-1058 (2000).
Xun Liu, "Qi Standard Wireless Power Transfer Technology Development Toward Spatial Freedom", *IEEE Circuits and Systems Magazine*, Second Quarter 2015, pp. 32-39 (May 21, 2015).
Yates David C. et al., "Optimal Transmission Frequency for Ultralow-Power Short-Range Radio Links", *IEEE Transactions on Circuits and Systems—I*, Regular Papers, vol. 51, No. 7, pp. 1405-1413 (Jul. 2004).
Yoshihiro Konishi, *Microwave Electronic Circuit Technology*, Chapter 4, pp. 145-197 (Marcel Dekker, Inc., New York, NY 1998).
Ziaie, Babak et al., "A Low-Power Miniature Transmitter Using a Low-Loss Silicon Platform for Biotelemetry", *Proceedings—19th International Conference IEEE/EMBS*, pp. 2221-2224; Oct. 30-Nov. 2, 1997 (4 pages).
Indian Examination Report for Indian Application No. 735/DELNP/2008 dated Apr. 5, 2018.
U.S. Appl. No. 11/481,077, filed Jul. 5, 2006, Issued.
U.S. Appl. No. 12/055,963, filed Mar. 26, 2008, Issued.
U.S. Appl. No. 12/415,650, filed Mar. 31, 2009, Issued.
U.S. Appl. No. 12/415,616, filed Mar. 31, 2008, Issued.
U.S. Appl. No. 12/415,655, filed Mar. 31, 2009, Issued.
U.S. Appl. No. 12/415,667, filed Mar. 31, 2009, Issued.
U.S. Appl. No. 12/437,641, filed May 9, 2009, Issued.
U.S. Appl. No. 12/466,065, filed May 14, 2009, Issued.
U.S. Appl. No. 12/553,957, filed Sep. 3, 2009, Abandoned.
U.S. Appl. No. 12/571,949, filed Oct. 1, 2009, Issued.
U.S. Appl. No. 12/639,958, filed Dec. 16, 2009, Abandoned.
U.S. Appl. No. 12/639,961, filed Dec. 16, 2009, Issued.
U.S. Appl. No. 12/639,962, filed Dec. 16, 2009, Issued.
U.S. Appl. No. 12/639,963, filed Dec. 16, 2009, Issued.
U.S. Appl. No. 12/639,966, filed Dec. 16, 2009, Issued.
U.S. Appl. No. 12/639,967, filed Dec. 16, 2009, Issued.
U.S. Appl. No. 12/639,972, filed Dec. 16, 2009, Issued.

(56) References Cited

OTHER PUBLICATIONS

U.S. Appl. No. 12/646,442, filed Dec. 23, 2009, Issued.
U.S. Appl. No. 12/646,524, filed Dec. 23, 2009, Issued.
U.S. Appl. No. 12/649,635, filed Dec. 30, 2009, Issued.
U.S. Appl. No. 12/649,777, filed Dec. 30, 2009, Issued.
U.S. Appl. No. 12/649,813, filed Dec. 30, 2009, Issued.
U.S. Appl. No. 12/649,852, filed Dec. 30, 2009, Issued.
U.S. Appl. No. 12/649,904, filed Dec. 30, 2009, Issued.
U.S. Appl. No. 12/649,973, filed Dec. 30, 2009, Issued.
U.S. Appl. No. 12/688,305, filed Jan. 15, 2010, Abandoned.
U.S. Appl. No. 12/688,339, filed Jan. 15, 2010, Abandoned.
U.S. Appl. No. 12/708,850, filed Feb. 19, 2010, Abandoned.
U.S. Appl. No. 12/713,556, filed Feb. 26, 2010, Abandoned.
U.S. Appl. No. 12/717,559, filed Mar. 4, 2010, Abandoned.
U.S. Appl. No. 12/726,742, filed Mar. 18, 2010, Abandoned.
U.S. Appl. No. 12/726,913, filed Mar. 18, 2010, Abandoned.
U.S. Appl. No. 12/726,953, filed Mar. 18, 2010, Abandoned.
U.S. Appl. No. 12/732,399, filed Mar. 26, 2010, Abandoned.
U.S. Appl. No. 12/949,504, filed Nov. 18, 2010, Abandoned.
U.S. Appl. No. 12/949,544, filed Nov. 18, 2010, Abandoned.
U.S. Appl. No. 12/949,580, filed Nov. 18, 2010, Abandoned.
U.S. Appl. No. 13/036,177, filed Feb. 28, 2011, Abandoned.
U.S. Appl. No. 13/288,308, filed Nov. 3, 2011, Abandoned.
U.S. Appl. No. 14/302,662, filed Jun. 12, 2014, Issued.
U.S. Appl. No. 14/629,709, filed Feb. 24, 2015, Issued.
U.S. Appl. No. 15/083,726, filed Mar. 29, 2016, Issued.
U.S. Appl. No. 15/793,198, filed Oct. 25, 2017, Allowed.

\* cited by examiner

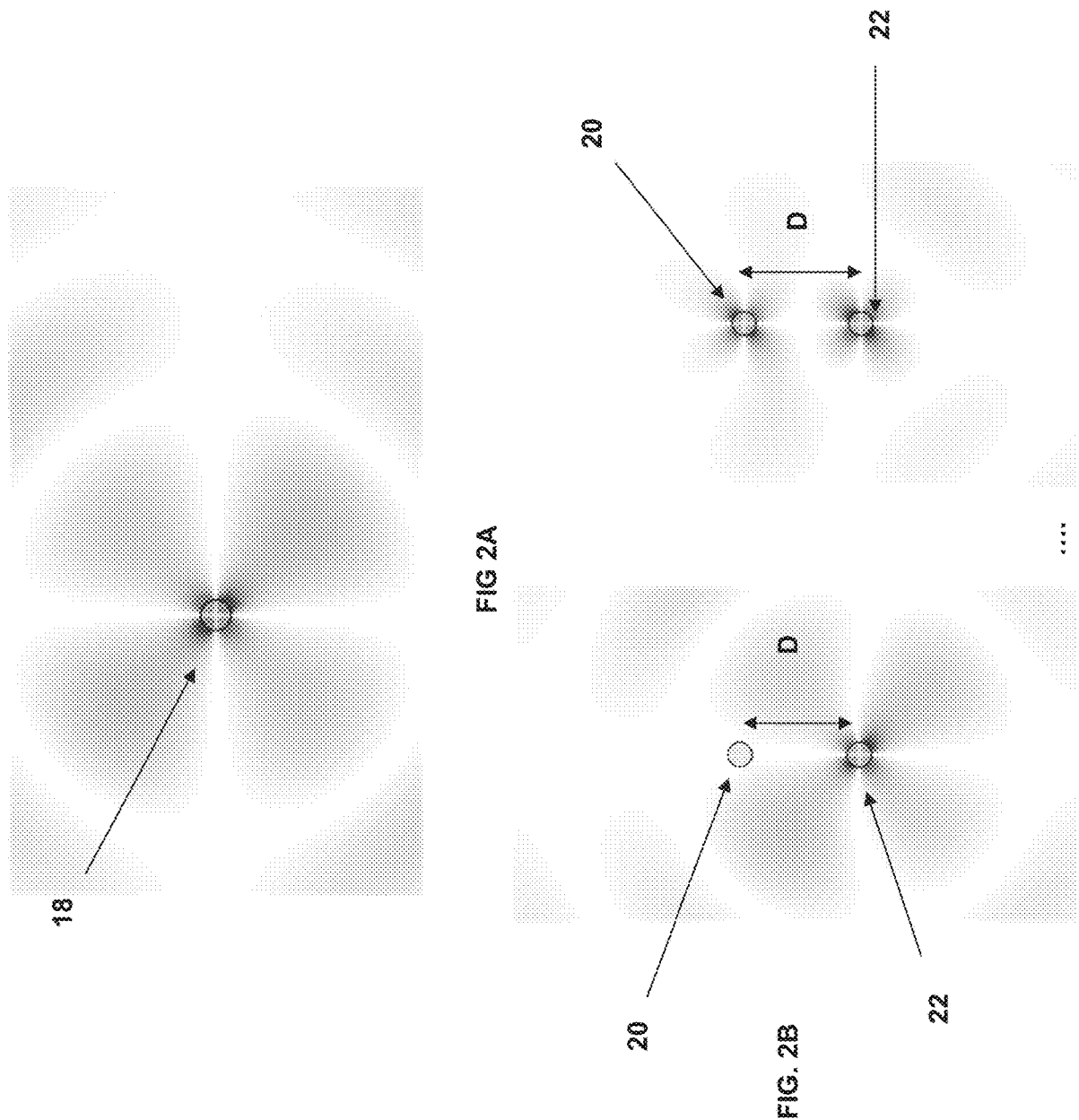

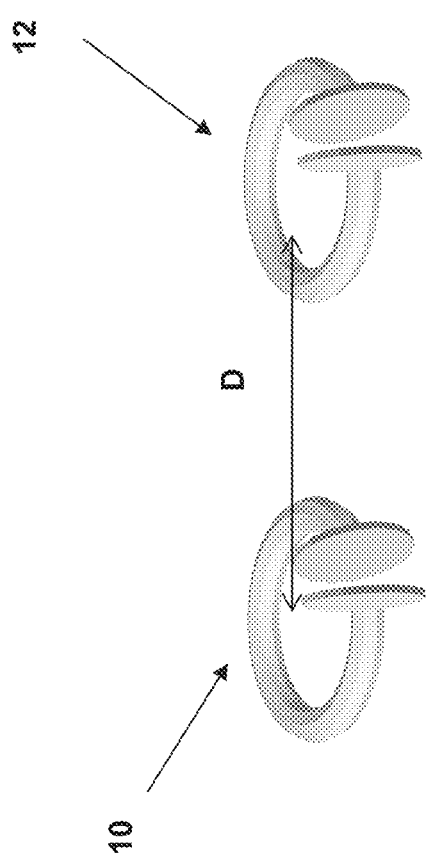

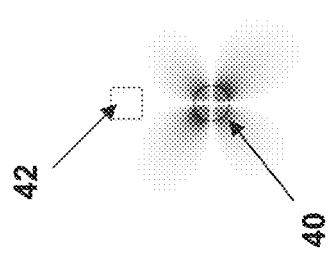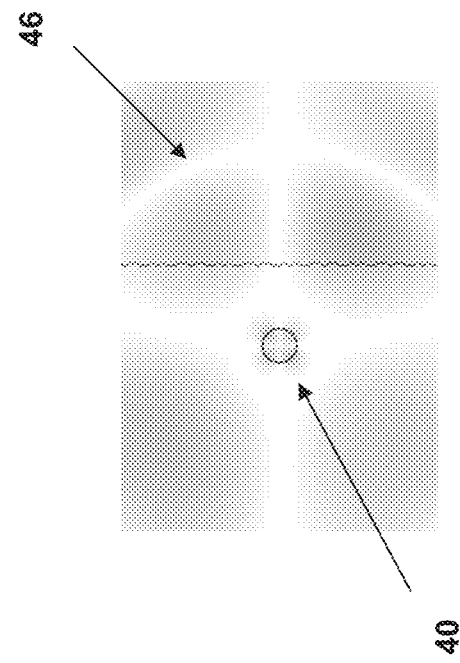
FIG. 4A
FIG. 4B

WIRELESS NON-RADIATIVE ENERGY TRANSFER

CROSS-REFERENCE TO RELATED APPLICATIONS

This application is a continuation and claims the benefit of priority under 35 USC § 120 to U.S. application Ser. No. 15/793,198, filed on Oct. 25, 2017, which is a continuation of U.S. application Ser. No. 15/083,726, filed on Mar. 29, 2016, now U.S. Pat. No. 9,831,722, which is a continuation of U.S. application Ser. No. 14/629,709, filed on Feb. 24, 2015, now U.S. Pat. No. 9,450,421, which is a continuation of U.S. application Ser. No. 14/302,662, filed on Jun. 12, 2014, now U.S. Pat. No. 9,065,286, which is a continuation of U.S. application Ser. No. 12/639,963, filed on Dec. 16, 2009, now U.S. Pat. No. 8,760,007, which is a continuation of U.S. application Ser. No. 12/553,957, filed on Sep. 3, 2009, which is a continuation of U.S. application Ser. No. 11/481,077 filed on Jul. 5, 2006, now U.S. Pat. No. 7,741,734, which claims priority under 35 USC § 119(e) to U.S. provisional application Ser. No. 60/698,442 filed on Jul. 12, 2005. The contents of the prior applications mentioned above are incorporated herein by reference in their entirety.

STATEMENT AS TO FEDERALLY FUNDED RESEARCH

This invention was made with government support awarded by the National Science Foundation under Grant No. DMR-0213282. The government has certain rights in this invention.

BACKGROUND OF THE INVENTION

The invention relates to the field of oscillatory resonant electromagnetic modes, and in particular to oscillatory resonant electromagnetic modes, with localized slowly evanescent field patterns, for wireless non-radiative energy transfer.

In the early days of electromagnetism, before the electrical-wire grid was deployed, serious interest and effort was devoted towards the development of schemes to transport energy over long distances wirelessly, without any carrier medium. These efforts appear to have met with little, if any, success. Radiative modes of omnidirectional antennas, which work very well for information transfer, are not suitable for such energy transfer, because a vast majority of energy is wasted into free space. Directed radiation modes, using lasers or highly-directional antennas, can be efficiently used for energy transfer, even for long distances (transfer distance $L_{TRANS} \ll L_{DEV}$, where $L_{DEV}$ is the characteristic size of the device), but require existence of an uninterruptible line-of-sight and a complicated tracking system in the case of mobile objects.

Rapid development of autonomous electronics of recent years (e.g. laptops, cell-phones, house-hold robots, that all typically rely on chemical energy storage) justifies revisiting investigation of this issue. Today, the existing electrical-wire grid carries energy almost everywhere; even a medium-range wireless non-radiative energy transfer would be quite useful. One scheme currently used for some important applications relies on induction, but it is restricted to very close-range ($L_{TRANS} \ll L_{DEV}$) energy transfers.

SUMMARY OF THE INVENTION

According to one aspect of the invention, there is provided an electromagnetic energy transfer device. The electromagnetic energy transfer device includes a first resonator structure receiving energy from an external power supply. The first resonator structure has a first Q-factor. A second resonator structure is positioned distal from the first resonator structure, and supplies useful working power to an external load. The second resonator structure has a second Q-factor. The distance between the two resonators can be larger than the characteristic size of each resonator. Non-radiative energy transfer between the first resonator structure and the second resonator structure is mediated through coupling of their resonant-field evanescent tails.

According to another aspect of the invention, there is provided a method of transferring electromagnetic energy. The method includes providing a first resonator structure receiving energy from an external power supply. The first resonator structure has a first Q-factor. Also, the method includes a second resonator structure being positioned distal from the first resonator structure, and supplying useful working power to an external load. The second resonator structure has a second Q-factor. The distance between the two resonators can be larger than the characteristic size of each resonator. Furthermore, the method includes transferring non-radiative energy between the first resonator structure and the second resonator structure through coupling of their resonant-field evanescent tails.

In another aspect, a method of transferring energy is disclosed including the steps of providing a first resonator structure receiving energy from an external power supply, said first resonator structure having a first resonant frequency $\omega_1$, and a first Q-factor $Q_1$, and characteristic size $L_1$. Providing a second resonator structure being positioned distal from said first resonator structure, at closest distance D, said second resonator structure having a second resonant frequency $\omega_2$, and a second Q-factor $Q_2$, and characteristic size $L_2$, where the two said frequencies $\omega_1$ and $\omega_2$ are close to within the narrower of the two resonance widths $\Gamma_1$, and $\Gamma_2$, and transferring energy non-radiatively between said first resonator structure and said second resonator structure, said energy transfer being mediated through coupling of their resonant-field evanescent tails, and the rate of energy transfer between said first resonator and said second resonator being denoted by $\kappa$, where non-radiative means D is smaller than each of the resonant wavelengths $\lambda_1$ and $\lambda_2$, where c is the propagation speed of radiation in the surrounding medium.

Embodiments of the method may include any of the following features. In some embodiments, said resonators have $Q_1<100$ and $Q_2<100$, $Q_1<200$ and $Q_2<200$, $Q_1<500$ and $Q_2<500$, or even $Q_1<1000$ and $Q_2<1000$. In some such embodiments, $\kappa/\sqrt{\Gamma_1 * \Gamma_2}$ may be greater than 0.2, greater than 0.5, greater than 1, greater than 2, or even grater than 5. In some such embodiments $D/L_2$ may be greater than 1, greater than 2, greater than 3, greater than 5.

In another aspect, an energy transfer device is disclosed which includes: a first resonator structure receiving energy from an external power supply, said first resonator structure having a first resonant frequency $\omega_1$, and a first Q-factor $Q_1$, and characteristic size $L_1$, and a second resonator structure being positioned distal from said first resonator structure, at closest distance D, said second resonator structure having a second resonant frequency $\omega_2$, and a second Q-factor $Q_2$, and characteristic size $L_2$.

The two said frequencies $\omega_1$ and $\omega_2$ are close to within the narrower of the two resonance widths $\Gamma_1$, and $\Gamma_2$. The non-radiative energy transfer between said first resonator structure and said second resonator structure is mediated through coupling of their resonant-field evanescent tails, and the rate of energy transfer between said first resonator and said second resonator is denoted by κ. The non-radiative means D is smaller than each of the resonant wavelengths $\lambda_1$ and $\lambda_2$, where c is the propagation speed of radiation in the surrounding medium.

Embodiments of the device may include any of the following features. In some embodiments, said resonators have $Q_1<100$ and $Q_2<100$, $Q_1<200$ and $Q_2<200$, $Q_1<500$ and $Q_2<500$, or even $Q_1<1000$ and $Q_2<1000$. In some such embodiments, $\kappa/\sqrt{\Gamma_1*\Gamma_2}$ may be greater than 0.2, greater than 0.5, greater than 1, greater than 2, or even grater than 5. In some such embodiments $D/L_2$ may be greater than 1, greater than 2, greater than 3, or even greater than 5.

In some embodiments, the resonant field in the device is electromagnetic.

In some embodiments, the first resonator structure includes a dielectric sphere, where the characteristic size $L_1$ is the radius of the sphere.

In some embodiments, the first resonator structure includes a metallic sphere, where the characteristic size $L_1$ is the radius of the sphere.

In some embodiments, the first resonator structure includes a metallodielectric sphere, where the characteristic size $L_1$ is the radius of the sphere.

In some embodiments, the first resonator structure includes a plasmonic sphere, where the characteristic size $L_1$ is the radius of the sphere.

In some embodiments, the first resonator structure includes a polaritonic sphere, where the characteristic size $L_1$ is the radius of the sphere.

In some embodiments, the first resonator structure includes a capacitively-loaded conducting-wire loop, where the characteristic size $L_1$ is the radius of the loop.

In some embodiments, the second resonator structure includes a dielectric sphere, where the characteristic size $L_2$ is the radius of the sphere.

In some embodiments, the second resonator structure includes a metallic sphere where the characteristic size $L_2$ is the radius of the sphere.

In some embodiments, the second resonator structure includes a metallodielectric sphere where the characteristic size $L_2$ is the radius of the sphere.

In some embodiments, the second resonator structure includes a plasmonic sphere where the characteristic size $L_2$ is the radius of the sphere.

In some embodiments, the second resonator structure includes a polaritonic sphere where the characteristic size $L_2$ is the radius of the sphere.

In some embodiments, the second resonator structure includes a capacitively-loaded conducting-wire loop where the characteristic size $L_2$ is the radius of the loop.

In some embodiments, the resonant field in the device is acoustic.

It is to be understood that embodiments of the above described methods and devices may include any of the above listed features, alone or in combination.

BRIEF DESCRIPTION OF THE DRAWINGS

FIG. 2A is a numerical FDTD result for a high-index disk cavity of radius r along with the electric field; FIG. 2B a numerical FDTD result for a medium-distance coupling between two resonant disk cavities: initially, all the energy is in one cavity (left panel); after some time both cavities are equally excited (right panel).

FIG. 3 is schematic diagram demonstrating two capacitively-loaded conducting-wire loops;

FIGS. 4A-4B are numerical FDTD results for reduction in radiation-Q of the resonant disk cavity due to scattering from extraneous objects;

DETAILED DESCRIPTION OF THE INVENTION

In contrast to the currently existing schemes, the invention provides the feasibility of using long-lived oscillatory resonant electromagnetic modes, with localized slowly evanescent field patterns, for wireless non-radiative energy transfer. The basis of this technique is that two same-frequency resonant objects tend to couple, while interacting weakly with other off-resonant environmental objects. The purpose of the invention is to quantify this mechanism using specific examples, namely quantitatively address the following questions: up to which distances can such a scheme be efficient and how sensitive is it to external perturbations. Detailed theoretical and numerical analysis show that a mid-range ($L_{TRANS} \approx$ few*$L_{DEV}$) wireless energy-exchange can actually be achieved, while suffering only modest transfer and dissipation of energy into other off-resonant objects.

The omnidirectional but stationary (non-lossy) nature of the near field makes this mechanism suitable for mobile wireless receivers. It could therefore have a variety of possible applications including for example, placing a source connected to the wired electricity network on the ceiling of a factory room, while devices, such as robots, vehicles, computers, or similar, are roaming freely within the room. Other possible applications include electric-engine buses, RFIDs, and perhaps even nano-robots. Similarly, in some embodiments multiple sources can transfer energy to one or more device objects. For example, as explained at in the paragraph bridging pages 4-5 of U.S. Provisional Application No. 60/698,442 to which the present application claims benefit and which is incorporated by reference above, for certain applications having uneven power transfer to the device object as the distance between the device and the source changes, multiple sources can be strategically placed to alleviate the problem, and/or the peak amplitude of the source can be dynamically adjusted.

Figure 1:
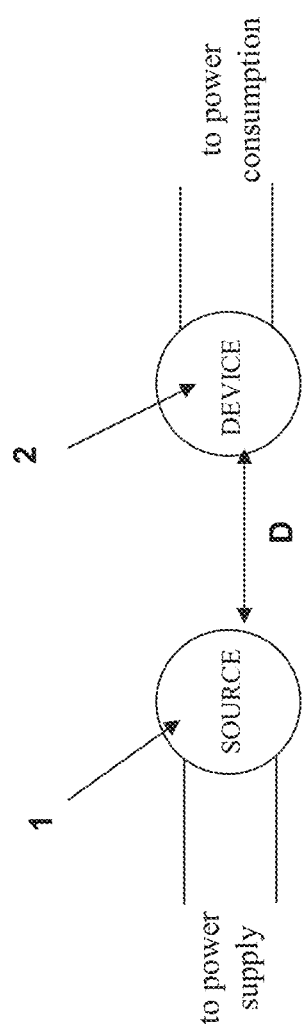
FIG. 1 is a schematic diagram illustrating an exemplary embodiment of the invention.

The range and rate of the inventive wireless energy-transfer scheme are the first subjects of examination, without considering yet energy drainage from the system for use into work. An appropriate analytical framework for modeling the exchange of energy between resonant objects is a weak-coupling approach called "coupled-mode theory". FIG. 1 is a schematic diagram illustrating a general description of the invention. The invention uses a source and device to perform energy transferring. Both the source 1 and device 2 are resonator structures, and are separated a distance D from each other. In this arrangement, the electromagnetic field of the system of source 1 and device 2 is approximated by $F(r,t) \approx a_1(t)F_1(r)+a_2(t)F_2(r)$, where $F_{1,2}(r)=[E_{1,2}(r)\ H_{1,2}(r)]$ are the eigenmodes of source 1 and device 2 alone, and then the field amplitudes $a_1(t)$ and $a_2(t)$ can be shown to satisfy the "coupled-mode theory":

$$\frac{da_1}{dt} = -i(\omega_1 - i\Gamma_1)a_1 + i\kappa_{11}a_1 + i\kappa_{12}a_2 \quad (1)$$

$$\frac{da_2}{dt} = -i(\omega_2 - i\Gamma_2)a_2 + i\kappa_{22}a_2 + i\kappa_{21}a_1,$$

where $\omega_{1,2}$ are the individual eigen-frequencies, $\Gamma_{1,2}$ are the resonance widths due to the objects' intrinsic (absorption, radiation etc.) losses, $\kappa_{12,21}$ are the coupling coefficients, and $\kappa_{11,22}$ model the shift in the complex frequency of each object due to the presence of the other.

The approach of Eq. 1 has been shown, on numerous occasions, to provide an excellent description of resonant phenomena for objects of similar complex eigen-frequencies (namely $|\omega_1-\omega_2|<<|\kappa_{12,21}|$ and $\Gamma_1 \approx \Gamma_2$), whose resonances are reasonably well defined (namely $\Gamma_{1,2}$& $\text{Im}\{\kappa_{11,22}\}<<|\kappa_{12,21}|$) and in the weak coupling limit (namely $|\kappa_{12,21}|<<\omega_{1,2}$). Coincidentally, these requirements also enable optimal operation for energy transfer. Also, Eq. (1) show that the energy exchange can be nearly perfect at exact resonance ($\omega_1=\omega_2$ and $\Gamma_1=\Gamma_2$), and that the losses are minimal when the "coupling-time" is much shorter than all "loss-times". Therefore, the invention requires resonant modes of high $Q=\omega/(2\Gamma)$ for low intrinsic-loss rates $\Gamma_{1,2}$, and with evanescent tails significantly longer than the characteristic sizes $L_1$ and $L_2$ of the two objects for strong coupling rate $|\kappa_{12,21}|$ over large distances D, where D is the closest distance between the two objects. This is a regime of operation that has not been studied extensively, since one usually prefers short tails, to minimize interference with nearby devices.

Objects of nearly infinite extent, such as dielectric waveguides, can support guided modes whose evanescent tails are decaying exponentially in the direction away from the object, slowly if tuned close to cutoff, and can have nearly infinite $Q$. To implement the inventive energy-transfer scheme, such geometries might be suitable for certain applications, but usually finite objects, namely ones that are topologically surrounded everywhere by air, are more appropriate.

Unfortunately, objects of finite extent cannot support electromagnetic states that are exponentially decaying in all directions in air, since in free space: $\vec{k}^2=\omega^2/c^2$. Because of this, one can show that they cannot support states of infinite $Q$. However, very long-lived (so-called "high-$Q$") states can be found, whose tails display the needed exponential-like decay away from the resonant object over long enough distances before they turn oscillatory (radiative). The limiting surface, where this change in the field behavior happens, is called the "radiation caustic", and, for the wireless energy-transfer scheme to be based on the near field rather than the far/radiation field, the distance between the coupled objects must be such that one lies within the radiation caustic of the other.

The invention is very general and any type of resonant structure satisfying the above requirements can be used for its implementation. As examples and for definiteness, one can choose to work with two well-known, but quite different electromagnetic resonant systems: dielectric disks and capacitively-loaded conducting-wire loops. Even without optimization, and despite their simplicity, both will be shown to exhibit fairly good performance. Their difference lies mostly in the frequency range of applicability due to practical considerations, for example, in the optical regime dielectrics prevail, since conductive materials are highly lossy.

Consider a 2D dielectric disk cavity of radius r and permittivity $\varepsilon$ surrounded by air that supports high-$Q$ whispering-gallery modes, as shown in FIG. 2A. Such a cavity is studied using both analytical modeling, such as separation of variables in cylindrical coordinates and application of boundary conditions, and detailed numerical finite-difference-time-domain (FDTD) simulations with a resolution of 30 pts/r. Note that the physics of the 3D case should not be significantly different, while the analytical complexity and numerical requirements would be immensely increased. The results of the two methods for the complex eigen-frequencies and the field patterns of the so-called "leaky" eigenmodes are in an excellent agreement with each other for a variety of geometries and parameters of interest.

The radial modal decay length, which determines the coupling strength $\kappa \equiv |\kappa_{21}|=|\kappa_{12}|$, is on the order of the wavelength, therefore, for near-field coupling to take place between cavities whose distance is much larger than their size, one needs subwavelength-sized resonant objects ($r<<\lambda$). High-radiation-$Q$ and long-tailed subwavelength resonances can be achieved, when the dielectric permittivity $\varepsilon$ is as large as practically possible and the azimuthal field variations (of principal number m) are slow (namely m is small).

One such TE-polarized dielectric-cavity mode, which has the favorable characteristics $Q_{rad}=1992$ and $\lambda/r=20$ using $\varepsilon=147.7$ and m=2, is shown in FIG. 2A, and will be the "test" cavity 18 for all subsequent calculations for this class of resonant objects. Another example of a suitable cavity has $Q_{rad}=9100$ and $\lambda/r=10$ using $\varepsilon=65.61$ and m=3. These values of $\varepsilon$ might at first seem unrealistically large. However, not only are there in the microwave regime (appropriate for meter-range coupling applications) many materials that have both reasonably high enough dielectric constants and low losses, for example, Titania: $\varepsilon \approx 96$, $\text{Im}\{\varepsilon\}/\varepsilon \approx 10^{-3}$; Barium tetratitanate: $\varepsilon \approx 37$, $\text{Im}\{\varepsilon\}/\varepsilon \approx 10^{-4}$; Lithium tantalite: $\varepsilon \approx 40$, $\text{Im}\{\varepsilon\}/\varepsilon \approx 10^{-4}$; etc.), but also $\varepsilon$ could instead signify the effective index of other known subwavelength ($\lambda/r<<1$) surface-wave systems, such as surface-plasmon modes on surfaces of metal-like (negative-$\varepsilon$) materials or metallodielectric photonic crystals.

With regards to material absorption, typical loss tangents in the microwave (e.g. those listed for the materials above) suggest that $Q_{abs} \sim \varepsilon/\text{Im}\{\varepsilon\} \sim 10000$. Combining the effects of radiation and absorption, the above analysis implies that for a properly designed resonant device-object d a value of $Q_d \sim 2000$ should be achievable. Note though, that the resonant source s will in practice often be immobile, and the restrictions on its allowed geometry and size will typically be much less stringent than the restrictions on the design of the device; therefore, it is reasonable to assume that the radiative losses can be designed to be negligible allowing for $Q_s \sim 10000$, limited only by absorption.

To calculate now the achievable rate of energy transfer, one can place two of the cavities 20, 22 at distance D between their centers, as shown in FIG. 2B. The normal modes of the combined system are then an even and an odd superposition of the initial modes and their frequencies are split by the coupling coefficient K, which we want to calculate. Analytically, coupled-mode theory gives for dielectric objects $\kappa_{12}=\omega_2/2 \cdot \int d^3r E_1^*(r)E_2(r)\varepsilon_1(r)/\int d^3r |E_1(r)|^2$ ε(r), where $\varepsilon_{1,2}(r)$ denote the dielectric functions of only object 1 alone or 2 alone excluding the background dielectric (free space) and ε(r) the dielectric function of the entire space with both objects present. Numerically, one can find κ using FDTD simulations either by exciting one of the cavities and calculating the energy-transfer time to the other or by determining the split normal-mode frequencies. For the "test" disk cavity the radius $r_C$ of the radiation caustic is $r_C \approx 11r$, and for non-radiative coupling $D < r_C$, therefore here one can choose D/r=10, 7, 5, 3. Then, for the mode of FIG. 3, which is odd with respect to the line that connects the two cavities, the analytical predictions are ω/2κ=1602, 771, 298, 48, while the numerical predictions are ω/2κ=1717, 770, 298, 47 respectively, so the two methods agree well. The radiation fields of the two initial cavity modes interfere constructively or destructively depending on their relative phases and amplitudes, leading to increased or decreased net radiation loss respectively, therefore for any cavity distance the even and odd normal modes have $Q$ s that are one larger and one smaller than the initial single-cavity $Q$ =1992 (a phenomenon not captured by coupled-mode theory), but in a way that the average Γ is always approximately Γ=ω/2$Q$ . Therefore, the corresponding coupling-to-loss ratios are κ/Γ=1.16, 2.59, 6.68, 42.49, and although they do not fall in the ideal operating regime κ/Γ<<1, the achieved values are still large enough to be useful for applications.

Consider a loop 10 or 12 of N coils of radius r of conducting wire with circular cross-section of radius a surrounded by air, as shown in FIG. 3. This wire has inductance $L = \mu_o N^2 r[\ln(8r/a) - 2]$, where $\mu_o$ is the magnetic permeability of free space, so connecting it to a capacitance C will make the loop resonant at frequency $\omega = 1/\sqrt{LC}$. The nature of the resonance lies in the periodic exchange of energy from the electric field inside the capacitor due to the voltage across it to the magnetic field in free space due to the current in the wire. Losses in this resonant system consist of ohmic loss inside the wire and radiative loss into free space.

For non-radiative coupling one should use the near-field region, whose extent is set roughly by the wavelength λ, therefore the preferable operating regime is that where the loop is small (r<<λ). In this limit, the resistances associated with the two loss channels are respectively $R_{ohm} = \sqrt{\mu_o \rho \omega / 2} \cdot Nr/a$ and $R_{rad} = \pi/6 \cdot \eta_o N^2 (\omega r/c)^4$, where ρ is the resistivity of the wire material and $\eta_o \approx 120\pi$ Ω is the impedance of free space. The quality factor of such a resonance is then $Q = \omega L/(R_{ohm} + R_{rad})$ and is highest for some frequency determined by the system parameters: at lower frequencies it is dominated by ohmic loss and at higher frequencies by radiation.

To get a rough estimate in the microwave, one can use one coil (N=1) of copper ($\rho = 1.69 \cdot 10^{-8}$ Ωm) wire and then for r=1 cm and a=1 mm, appropriate for example for a cell phone, the quality factor peaks to $Q$ =1225 at f=380 MHz, for r=30 cm and a=2 mm for a laptop or a household robot $Q$ =1103 at f=17 MHz, while for r=1 m and a=4 mm (that could be a source loop on a room ceiling) $Q$ =1315 at f=5 MHz. So in general, expected quality factors are $Q \approx$ 1000-1500 at λ/r≈50-80, namely suitable for near-field coupling.

The rate for energy transfer between two loops 10 and 12 at distance D between their centers, as shown in FIG. 3, is given by $\kappa_{12} = \omega M/2\sqrt{L_1 L_2}$, where M is the mutual inductance of the two loops 10 and 12. In the limit r<<D<<λ one can use the quasi-static result $M = \pi/4 \cdot \mu_o N_1 N_2 (r_1 r_2)^2/D^3$, which means that $\omega/2\kappa \sim (D/\sqrt{r_1 r_2})^3$. For example, by choosing again D/r=10, 8, 6 one can get for two loops of r=1 cm, same as used before, that ω/2κ=3033, 1553, 655 respectively, for the r=30 cm that ω/2κ=7131, 3651, 1540, and for the r=1 m that ω/2κ=6481, 3318, 1400. The corresponding coupling-to-loss ratios peak at the frequency where peaks the single-loop $Q$ and are κ/Γ=0.4, 0.79, 1.97 and 0.15, 0.3, 0.72 and 0.2, 0.4, 0.94 for the three loop-kinds and distances. An example of dissimilar loops is that of a r=1 m (source on the ceiling) loop and a r=30 cm (household robot on the floor) loop at a distance D=3 m (room height) apart, for which $\kappa/\sqrt{\Gamma_1 \Gamma_2} = 0.88$ peaks at f=6.4 MHz, in between the peaks of the individual $Q$ 's. Again, these values are not in the optimal regime κ/Γ<<1, but will be shown to be sufficient.

It is important to appreciate the difference between this inductive scheme and the already used close-range inductive schemes for energy transfer in that those schemes are non-resonant. Using coupled-mode theory it is easy to show that, keeping the geometry and the energy stored at the source fixed, the presently proposed resonant-coupling inductive mechanism allows for $Q$ approximately 1000 times more power delivered for work at the device than the traditional non-resonant mechanism, and this is why mid-range energy transfer is now possible. Capacitively-loaded conductive loops are actually being widely used as resonant antennas (for example in cell phones), but those operate in the far-field regime with r/λ~1, and the radiation $Q$ 's are intentionally designed to be small to make the antenna efficient, so they are not appropriate for energy transfer.

Clearly, the success of the inventive resonance-based wireless energy-transfer scheme depends strongly on the robustness of the objects' resonances. Therefore, their sensitivity to the near presence of random non-resonant extraneous objects is another aspect of the proposed scheme that requires analysis. The interaction of an extraneous object with a resonant object can be obtained by a modification of the coupled-mode-theory model in Eq. (1), since the extraneous object either does not have a well-defined resonance or is far-off-resonance, the energy exchange between the resonant and extraneous objects is minimal, so the term $\kappa_{12}$ in Eq. (1) can be dropped. The appropriate analytical model for the field amplitude in the resonant object $a_1(t)$ becomes:

$$\frac{da_1}{dt} = -i(\omega_1 - i\Gamma_1)a_1 + i\kappa_{11}a_1 \qquad (2)$$

Figure 7:
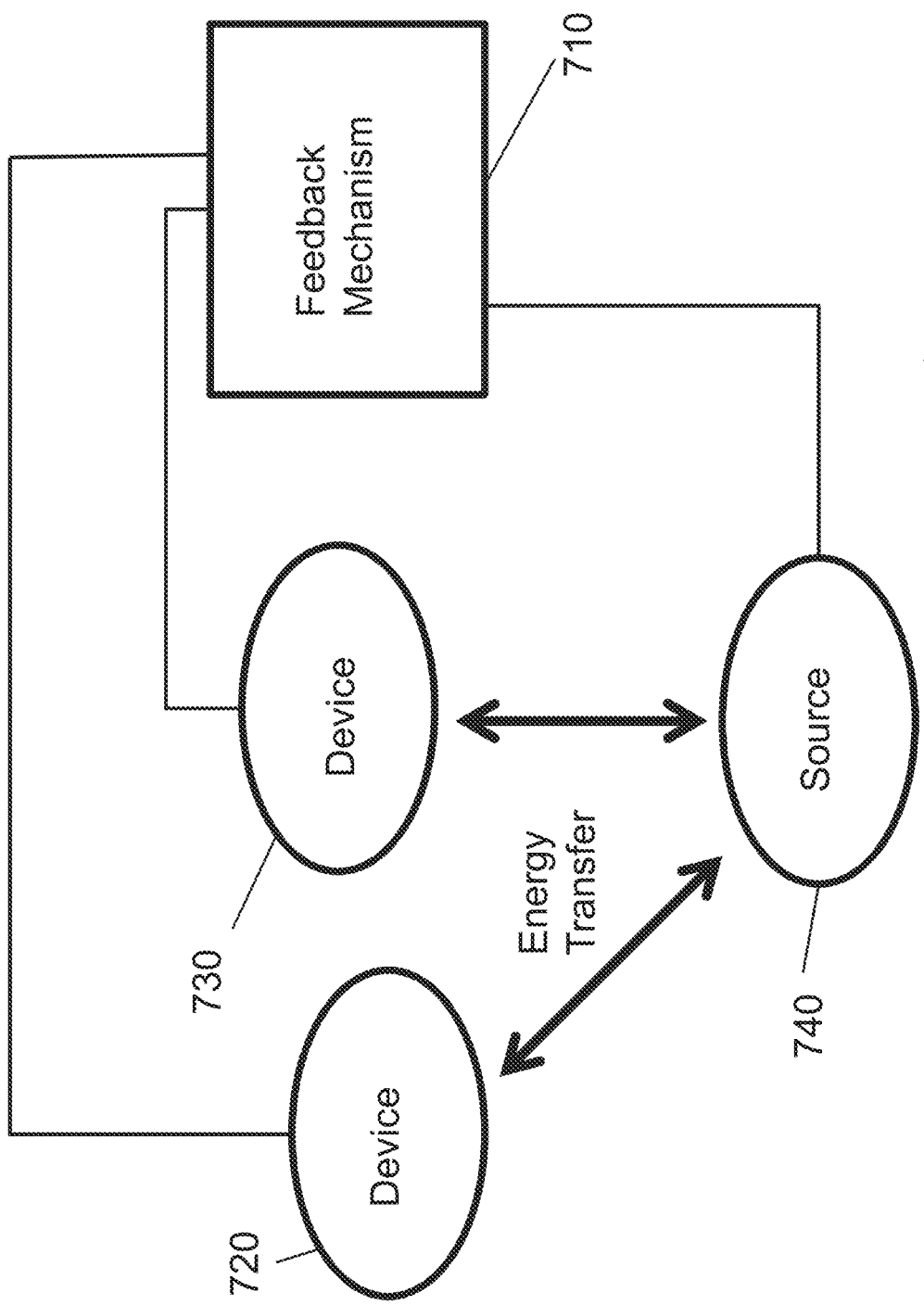
FIG. 7 is a schematic diagram of a feedback mechanism to correct the resonators exchanging wireless energy for detuning because of the effect of an extraneous object.

Namely, the effect of the extraneous object is just a perturbation on the resonance of the resonant object and it is twofold: First, it shifts its resonant frequency through the real part of $\kappa_{11}$ thus detuning it from other resonant objects. As shown in FIG. 7, this is a problem that can be fixed rather easily by applying a feedback mechanism 710 to every device (e.g., device resonators 720 and 730) that corrects its frequency, such as through small changes in geometry, and matches it to that of the source resonator 740. Second, it forces the resonant object to lose modal energy due to scattering into radiation from the extraneous object through the induced polarization or currents in it, and due to material absorption in the extraneous object through the imaginary part of $\kappa_{11}$. This reduction in Q can be a detrimental effect to the functionality of the energy-transfer scheme, because it cannot be remedied, so its magnitude must be quantified.

In the first example of resonant objects that have been considered, the class of dielectric disks, small, low-index, low-material-loss or far-away stray objects will induce small scattering and absorption. To examine realistic cases that are more dangerous for reduction in $Q$ , one can therefore place the "test" dielectric disk cavity 40 close to: a) another off-resonance object 42, such as a human being, of large Re{ε}=49 and Im{ε}=16 and of same size but different shape, as shown in FIG. 4A; and b) a roughened surface 46, such as a wall, of large extent but of small Re{ε}=2.5 and Im{ε}=0.05, as shown in FIG. 4B.

Analytically, for objects that interact with a small perturbation the reduced value of radiation $Q$ due to scattering could be estimated using the polarization $\int d^3r|P_{X1}(r)|^2 \propto \int d^3r|E_1(r)\cdot Re\{\varepsilon_X(r)\}|^2$ induced by the resonant cavity 1 inside the extraneous object X=42 or roughened surface X=46. Since in the examined cases either the refractive index or the size of the extraneous objects is large, these first-order perturbation-theory results would not be accurate enough, thus one can only rely on numerical FDTD simulations. The absorption $Q$ inside these objects can be estimated through $Im\{\kappa_{11}\}=\omega_1/2\cdot\int d^3r|E_1(r)|^2 Im\{(\varepsilon_X(r)\}/\int d^3r|E_1(r)|^2\varepsilon(r)$.

Using these methods, for distances D/r=10, 7, 5, 3 between the cavity and extraneous-object centers one can find that $Q_{rad}$=1992 is respectively reduced to $Q_{rad}$=1988, 1258, 702, 226, and that the absorption rate inside the object is $Q_{abs}$=312530, 86980, 21864, 1662, namely the resonance of the cavity is not detrimentally disturbed from high-index and/or high-loss extraneous objects, unless the (possibly mobile) object comes very close to the cavity. For distances D/r=10, 7, 5, 3, 0 of the cavity to the roughened surface we find respectively $Q_{rad}$=2101, 2257, 1760, 1110, 572, and $Q_{abs}$<4000, namely the influence on the initial resonant mode is acceptably low, even in the extreme case when the cavity is embedded on the surface. Note that a close proximity of metallic objects could also significantly scatter the resonant field, but one can assume for simplicity that such objects are not present.

Imagine now a combined system where a resonant source-object s is used to wirelessly transfer energy to a resonant device-object d but there is an off-resonance extraneous-object e present. One can see that the strength of all extrinsic loss mechanisms from e is determined by $|E_s(r_e)|^2$, by the square of the small amplitude of the tails of the resonant source, evaluated at the position $r_e$ of the extraneous object. In contrast, the coefficient of resonant coupling of energy from the source to the device is determined by the same-order tail amplitude $|E_s(r_e)|$, evaluated at the position $r_d$ of the device, but this time it is not squared! Therefore, for equal distances of the source to the device and to the extraneous object, the coupling time for energy exchange with the device is much shorter than the time needed for the losses inside the extraneous object to accumulate, especially if the amplitude of the resonant field has an exponential-like decay away from the source. One could actually optimize the performance by designing the system so that the desired coupling is achieved with smaller tails at the source and longer at the device, so that interference to the source from the other objects is minimal.

Figure 5:
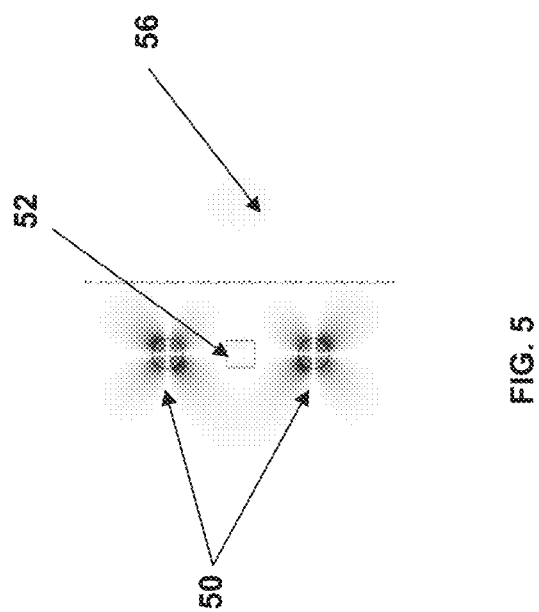
FIG. 5 is a numerical FDTD result for medium-distance coupling between two resonant disk cavities in the presence of extraneous objects.

The above concepts can be verified in the case of dielectric disk cavities by a simulation that combines FIGS. 2A-2B and 4A-4B, namely that of two (source-device) "test" cavities 50 placed 10r apart, in the presence of a same-size extraneous object 52 of ε=49 between them, and at a distance 5r from a large roughened surface 56 of ε=2.5, as shown in FIG. 5. Then, the original values of $Q$=1992, ω/2κ=1717 (and thus κ/Γ=1.16) deteriorate to $Q$=765, ω/2κ=965 (and thus κ/Γ=0.79). This change is acceptably small, considering the extent of the considered external perturbation, and, since the system design has not been optimized, the final value of coupling-to-loss ratio is promising that this scheme can be useful for energy transfer.

In the second example of resonant objects being considered, the conducting-wire loops, the influence of extraneous objects on the resonances is nearly absent. The reason for this is that, in the quasi-static regime of operation (r<<λ) that is being considered, the near field in the air region surrounding the loop is predominantly magnetic, since the electric field is localized inside the capacitor. Therefore, extraneous objects that could interact with this field and act as a perturbation to the resonance are those having significant magnetic properties (magnetic permeability Re{μ}<1 or magnetic loss Im{μ}<0). Since almost all common materials are non-magnetic, they respond to magnetic fields in the same way as free space, and thus will not disturb the resonance of a conducting-wire loop. The only perturbation that is expected to affect these resonances is a close proximity of large metallic structures.

An extremely important implication of the above fact relates to safety considerations for human beings. Humans are also non-magnetic and can sustain strong magnetic fields without undergoing any risk. This is clearly an advantage of this class of resonant systems for many real-world applications. On the other hand, dielectric systems of high (effective) index have the advantages that their efficiencies seem to be higher, judging from the larger achieved values of κ/Γ, and that they are also applicable to much smaller length-scales, as mentioned before.

Consider now again the combined system of resonant source s and device d in the presence of a human h and a wall, and now let us study the efficiency of this resonance-based energy-transfer scheme, when energy is being drained from the device for use into operational work. One can use the parameters found before: for dielectric disks, absorption-dominated loss at the source $Q_s$~$10^4$, radiation-dominated loss at the device $Q_d$~$10^3$ (which includes scattering from the human and the wall), absorption of the source- and device-energy at the human $Q_{s-h}$, $Q_{d-h}$~$10^4$-$10^5$ depending on his/her not-very-close distance from the objects, and negligible absorption loss in the wall; for conducting-wire loops, $Q_s$~$Q_d$~$10^3$, and perturbations from the human and the wall are negligible. With corresponding loss-rates Γ=ω/2$Q$, distance-dependent coupling κ, and the rate at which working power is extracted $\Gamma_w$, the coupled-mode-theory equation for the device field-amplitude is $$\frac{da_d}{dt} = -i(\omega - i\Gamma_d)a_d + i\kappa a_s - \Gamma_{d-h}a_d - \Gamma_w a_d. \quad (3)$$

Different temporal schemes can be used to extract power from the device and their efficiencies exhibit different dependence on the combined system parameters. Here, one can assume steady state, such that the field amplitude inside the source is maintained constant, namely $a_s(t)=A_s e^{-i\omega t}$, so then the field amplitude inside the device is $a_d(t)=A_d e^{-i\omega t}$ with $A_d=i\kappa(\Gamma_d+\Gamma_{d-h}+\Gamma_w)A_s$. Therefore, the power lost at the source is $P_s=2\Gamma_s|A_s|^2$, at the device it is $P_d=2\Gamma_d|A_d|^2$, the power absorbed at the human is $P_h=2\Gamma_{s-h}|A_s|^2+2\Gamma_{d-h}|A_d|^2$, and the useful extracted power is $P_w=2\Gamma_w|A_d|^2$. From energy conservation, the total power entering the system is $P_{total}=P_s+P_d+P_h+P_w$. Denote the total loss-rates $\Gamma_s^{tot}=\Gamma_s+\Gamma_{s-h}$ and $\Gamma_d^{tot}=\Gamma_d+\Gamma_{d-h}$. Depending on the targeted application, the work-drainage rate should be chosen either $\Gamma_w=\Gamma_d^{tot}$ to minimize the required energy stored in the resonant objects or $\Gamma_w=\Gamma_d^{tot}\sqrt{1+\kappa^2/\Gamma_s^{tot}\Gamma_d^{tot}}>\Gamma_d^{tot}$ such that the ratio of useful-to-lost powers, namely the efficiency $\eta_w=P_w/P_{total}$, is maximized for some value of $\kappa$. The efficiencies $\eta$ for the two different choices are shown in FIGS. 6A and 6B respectively, as a function of the $\kappa/\Gamma_d$ figure-of-merit which in turn depends on the source-device distance.

Figures 6A, 6B:
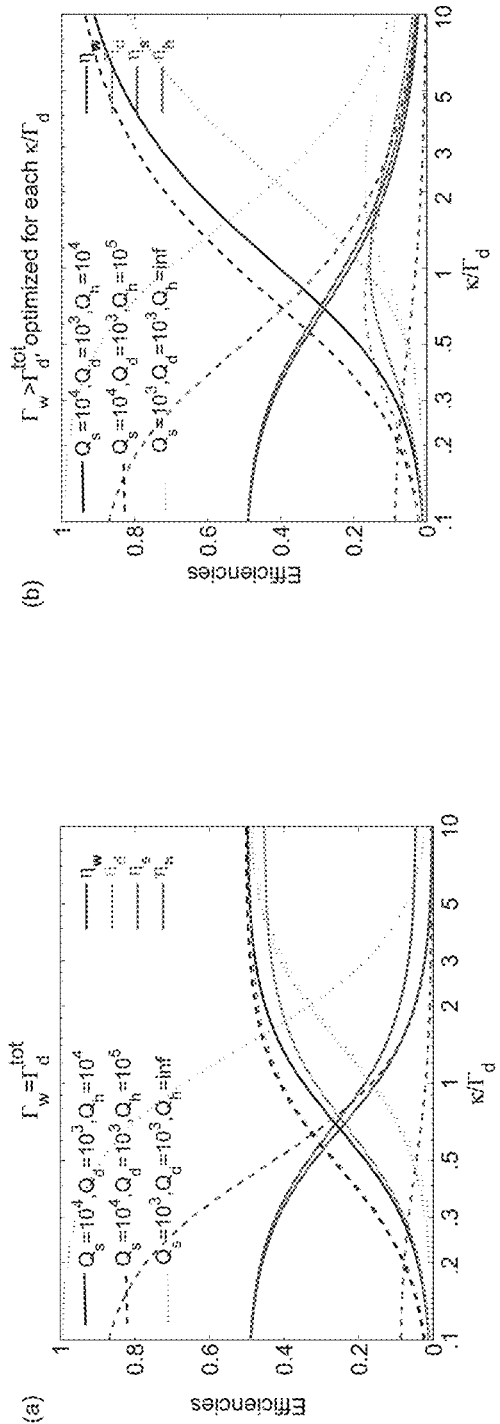
FIGS. 6A-6B are graphs demonstrating efficiencies of converting the supplied power into useful work ($\eta_w$), radiation and ohmic loss at the device ($\eta_d$), and the source ($\eta_s$), and dissipation inside a human ($\eta_h$), as a function of the coupling-to-loss ratio $\kappa/\Gamma_d$; in panel (a) $\Gamma_w$ is chosen so as to minimize the energy stored in the device, while in panel (b) $\Gamma_w$ is chosen so as to maximize the efficiency $\eta_w$ for each $\kappa/\Gamma_d$.

FIGS. 6A-6B show that for the system of dielectric disks and the choice of optimized efficiency, the efficiency can be large, e.g., at least 40%. The dissipation of energy inside the human is small enough, less than 5%, for values $\kappa/\Gamma_d<1$ and $Q<10^5$, namely for medium-range source-device distances ($D_d/r<10$) and most human-source/device distances ($D_h/r<8$). For example, for $D_d/r=10$ and $D_h/r=8$, if 10 W must be delivered to the load, then, from FIG. 6B, ~0.4 W will be dissipated inside the human, ~4 W will be absorbed inside the source, and ~2.6 W will be radiated to free space. For the system of conducting-wire loops, the achieved efficiency is smaller, ~20% for $\kappa/\Gamma_d\approx1$, but the significant advantage is that there is no dissipation of energy inside the human, as explained earlier.

Even better performance should be achievable through optimization of the resonant object designs. Also, by exploiting the earlier mentioned interference effects between the radiation fields of the coupled objects, such as continuous-wave operation at the frequency of the normal mode that has the larger radiation-Q, one could further improve the overall system functionality. Thus the inventive wireless energy-transfer scheme is promising for many modern applications. Although all considerations have been for a static geometry, all the results can be applied directly for the dynamic geometries of mobile objects, since the energy-transfer time $\kappa^{-1}\sim1$ μs, which is much shorter than any timescale associated with motions of macroscopic objects.

The invention provides a resonance-based scheme for mid-range wireless non-radiative energy transfer. Analyses of very simple implementation geometries provide encouraging performance characteristics for the potential applicability of the proposed mechanism. For example, in the macroscopic world, this scheme could be used to deliver power to robots and/or computers in a factory room, or electric buses on a highway (source-cavity would in this case be a "pipe" running above the highway). In the microscopic world, where much smaller wavelengths would be used and smaller powers are needed, one could use it to implement optical inter-connects for CMOS electronics or else to transfer energy to autonomous nano-objects, without worrying much about the relative alignment between the sources and the devices; energy-transfer distance could be even longer compared to the objects' size, since $\text{Im}\{(\epsilon(\omega)\}$ of dielectric materials can be much lower at the required optical frequencies than it is at microwave frequencies.

As a venue of future scientific research, different material systems should be investigated for enhanced performance or different range of applicability. For example, it might be possible to significantly improve performance by exploring plasmonic systems. These systems can often have spatial variations of fields on their surface that are much shorter than the free-space wavelength, and it is precisely this feature that enables the required decoupling of the scales: the resonant object can be significantly smaller than the exponential-like tails of its field. Furthermore, one should also investigate using acoustic resonances for applications in which source and device are connected via a common condensed-matter object.

Although the present invention has been shown and described with respect to several preferred embodiments thereof, various changes, omissions and additions to the form and detail thereof, may be made therein, without departing from the spirit and scope of the invention.

What is claimed is:

1. A wireless power system for providing power to a vehicle, the system comprising:
 a source resonator and a power supply coupled to the source resonator to provide power to the source resonator, the source resonator having a resonant frequency $\omega_1$, an intrinsic loss rate $\Gamma_1$, and capable of storing electromagnetic energy with an intrinsic quality factor $Q_1=\omega_1/(2\Gamma_1)$, the source resonator comprising at least one loop of conductive material and further comprising a capacitance; and
 a device resonator and a load coupled to the device resonator to receive power from the device resonator and for powering the vehicle, the device resonator having a resonant frequency $\omega_2$, an intrinsic loss rate $\Gamma_2$, and capable of storing electromagnetic energy with an intrinsic quality factor $Q_2=\omega_2/(2\Gamma_2)$, the device resonator comprising at least one loop of conductive material and further comprising a capacitance,
 wherein the source resonator and the device resonator are configured to resonantly and wirelessly couple electromagnetic power from the source resonator to the device resonator using non-radiative electromagnetic induction having an energy transfer rate $\kappa$, and wherein the intrinsic loss rates satisfy $\kappa/\sqrt{\Gamma_1\Gamma_2}>5$ over a range of distances D between the source resonator and the device resonator,
 wherein $Q_1>100$ and $Q_2>100$, and
 wherein the power supply is configured to dynamically adjust a peak amplitude of the electromagnetic power in the source resonator over the range of distances D.

2. The wireless power system of claim 1, wherein $Q_1>200$ and $Q_2>200$.

3. The wireless power system of claim 1, wherein $Q_1>500$ and $Q_2>500$.

4. The wireless power system of claim 1, wherein the power provided to the load from the device resonator defines a work drainage rate $\Gamma_w$, and wherein the work drainage rate $\Gamma_w$ is configured to be dynamically set as a function of the energy transfer rate $\kappa$ between the first and second resonators as the device resonator is moveable relative to the source resonator over the range of distances D.

5. The wireless power system of claim 4, wherein the work drainage rate $\Gamma_w$ is configured to be dynamically set such that the ratio of useful-to-lost power is maximized as a function of the energy transfer rate $\kappa$ over the range of distances D.

6. The wireless power system of claim 4, wherein the work drainage rate $\Gamma_w$ is configured to be dynamically set such that $\Gamma_w=\Gamma_2\sqrt{1+(\kappa^2/\Gamma_1\cdot\Gamma_2)}$ as a function of the energy transfer rate $\kappa$ over the range of distances D.

7. The wireless power system of claim 1, wherein the power provided to the load from the device resonator defines a work drainage rate $\Gamma_w$, and wherein the work drainage rate $\Gamma_w$ is configured to be set such that $\Gamma_w=\Gamma_2\sqrt{1+(\kappa^2/\Gamma_1\cdot\Gamma_2)}$ for some value of the energy transfer rate $\kappa$ in the range of distances D as the device resonator is moveable relative to the source resonator over the range of distances D.

8. The wireless power system of claim 1, wherein the power provided to the load from the device resonator defines a work drainage rate $\Gamma_w$, and wherein the work drainage rate $\Gamma_w$ is configured to be set such that the ratio of useful-to-lost power is maximized for some value of the energy transfer rate κ in the range of distances D as the device resonator is moveable relative to the source resonator over the range of distances D.

9. The wireless power system of claim 8, wherein the work drainage rate $\Gamma_w$ is configured to be set such that $\Gamma_w=\Gamma_2\sqrt{1+(\kappa^2/\Gamma_1\cdot F_2)}$ for said value of the energy transfer rate κ in the range of distances D as the device resonator is moveable relative to the source resonator over the range of distances D.

10. The wireless power system of claim 1, wherein the range of distances D includes D=6 cm.

11. The wireless power system of claim 1, wherein the range of distances D includes D=8 cm.

12. The wireless power system of claim 1, wherein the range of distances D includes D=10 cm.

13. A source module for a wireless power system for providing power to a vehicle, the wireless power system including a device module housed in the vehicle and comprising a device resonator and a load coupled to the device resonator to receive power from the device resonator and for powering the vehicle, the device resonator having a resonant frequency $\omega_2$, an intrinsic loss rate $\Gamma_2$, and capable of storing electromagnetic energy with an intrinsic quality factor $Q_2=\omega_2/(2\Gamma_2)$, the device resonator comprising at least one loop of conductive material and further comprising a capacitance, the source module comprising:
a source resonator and a power supply coupled to the source resonator to provide power to the source resonator, the source resonator having a resonant frequency $\omega_1$, an intrinsic loss rate $\Gamma_1$, and capable of storing electromagnetic energy with an intrinsic quality factor $Q_1=\omega_1/(2\Gamma_1)$, the source resonator comprising at least one loop of conductive material and further comprising a capacitance,
wherein the source resonator and the device resonator are configured to resonantly and wirelessly couple electromagnetic power from the source resonator to the device resonator using non-radiative electromagnetic induction having an energy transfer rate κ, and wherein the intrinsic loss rates satisfy $\kappa/\sqrt{\Gamma_1\Gamma_2}>5$ over a range of distances D between the source resonator and the device resonator, and
wherein $Q_1>100$ and $Q_2>100$, and
wherein the power supply is configured to dynamically adjust a peak amplitude of the electromagnetic power in the source resonator over the range of distances D.

14. The source module of claim 13, wherein $Q_1>200$ and $Q_2>200$.

15. A method for providing power wirelessly to a vehicle portable electronic device, wherein the vehicle is configured for use with a source resonator and a power supply coupled to the source resonator to provide power to the source resonator, the source resonator having a resonant frequency $\omega_1$, an intrinsic loss rate $\Gamma_1$, and capable of storing electromagnetic energy with an intrinsic quality factor $Q_1=\omega_1/(2\Gamma_1)$, the method comprising:
providing the vehicle with a device resonator and a load coupled to the device resonator to receive power from the device resonator and provide power to the vehicle, the device resonator having a resonant frequency $\omega_2$, an intrinsic loss rate $\Gamma_2$, and capable of storing electromagnetic energy with an intrinsic quality factor $Q_2=\omega_2/(2\Gamma_2)$, the device resonator comprising at least one loop of conductive material and further comprising a capacitance, wherein the device resonator is spaced from the source resonator and configured to move freely relative to the source resonator over a range of distances D between the source resonator and the device resonator; and
resonantly and wirelessly receiving electromagnetic power at the device resonator from the source resonator using non-radiative electromagnetic induction having an energy transfer rate κ, wherein the intrinsic loss rates satisfy $\kappa/\sqrt{\Gamma_1\Gamma_2}>5$ over the range of distances D, and wherein each intrinsic loss rate comprises a resistive component and a radiative component,
wherein $Q_1>100$ and $Q_2>100$, and
wherein the method further comprises dynamically adjusting a peak amplitude of the electromagnetic power in the source resonator over the range of distances D.

16. The method of claim 15, further comprising:
providing power to the load in the vehicle from the device resonator, wherein the power provided to the load from the device resonator defines a work drainage rate $\Gamma_w$, and wherein the work drainage rate $\Gamma_w$ is dynamically set as a function of the energy transfer rate κ between the first and second resonators as the device resonator moves relative to the source resonator over the range of distances D.

17. The method of claim 16, wherein the work drainage rate $\Gamma_w$ is dynamically set such that the ratio of useful-to-lost power is maximized as a function of the energy transfer rate κ over the range of distances D.

18. The method of claim 16, wherein the work drainage rate $\Gamma_w$ is dynamically set such that $\Gamma_w=\Gamma_2\sqrt{1+(\kappa^2/\Gamma_1\cdot F_2)}$ as a function of the energy transfer rate κ over the range of distances D.

19. The method of claim 15, further comprising:
providing power to the load in the vehicle from the device resonator, wherein the power provided to the load from the device resonator defines a work drainage rate $\Gamma_w$, and wherein the work drainage rate $\Gamma_w$ is set such that $\Gamma_w=\Gamma_2\sqrt{1+(\kappa^2/\Gamma_1\cdot F_2)}$ for some value of the energy transfer rate κ in the range of distances D as the device resonator is moveable relative to the source resonator over the range of distances D.

20. The method of claim 15, further comprising: providing power to the load in the vehicle from the device resonator, wherein the power provided to the load from the device resonator defines a work drainage rate $\Gamma_w$, and wherein the work drainage rate $\Gamma_w$ is set such that the ratio of useful-to-lost power is maximized for some value of the energy transfer rate x in the range of distances D as the device resonator is moveable relative to the source resonator over the range of distances D.

\* \* \* \* \*

UNITED STATES PATENT AND TRADEMARK OFFICE
CERTIFICATE OF CORRECTION

PATENT NO. : 10,666,091 B2  
APPLICATION NO. : 16/184354  
DATED : May 26, 2020  
INVENTOR(S) : John D. Joannopoulos, Aristeidis Karalis and Marin Soljacic Page 1 of 1

It is certified that error appears in the above-identified patent and that said Letters Patent is hereby corrected as shown below:

In the Claims

Column 12

Line 54 (Approx.), in Claim 6, delete "$\Gamma_w = \Gamma_2\sqrt{1+(\kappa^2/\Gamma_1 \cdot F_2)}$," and insert -- $\Gamma_w = \Gamma_2\sqrt{1+(\kappa^2/\Gamma_1 \cdot \Gamma_2)}$ --

Line 59 (Approx.), in Claim 7, delete "$\Gamma_w = \Gamma_2\sqrt{1+(\kappa^2/\Gamma_1 \cdot F_2)}$," and insert -- $\Gamma_w = \Gamma_2\sqrt{1+(\kappa^2/\Gamma_1 \cdot \Gamma_2)}$ --

Column 13

Line 6, in Claim 9, delete "$\Gamma_w = \Gamma_2\sqrt{1+(\kappa^2/\Gamma_1 \cdot F_2)}$," and insert -- $\Gamma_w = \Gamma_2\sqrt{1+(\kappa^2/\Gamma_1 \cdot \Gamma_2)}$ --

Column 14

Line 38 (Approx.), in Claim 18, delete "$\Gamma_w = \Gamma_2\sqrt{1+(\kappa^2/\Gamma_1 \cdot F_2)}$," and insert -- $\Gamma_w = \Gamma_2\sqrt{1+(\kappa^2/\Gamma_1 \cdot \Gamma_2)}$ --

Line 46 (Approx.), in Claim 19, delete "$\Gamma_w = \Gamma_2\sqrt{1+(\kappa^2/\Gamma_1 \cdot F_2)}$," and insert -- $\Gamma_w = \Gamma_2\sqrt{1+(\kappa^2/\Gamma_1 \cdot \Gamma_2)}$ --

Line 54 (Approx.), in Claim 20, delete "$\Gamma_w$," and insert -- $\Gamma_w$ --  
Line 56 (Approx.), in Claim 20, delete "$x$" and insert -- $\kappa$ --

Signed and Sealed this  
Fourteenth Day of July, 2020

Andrei Iancu  
*Director of the United States Patent and Trademark Office*